(12) United States Patent
Venetsky et al.

(10) Patent No.: US 7,606,411 B2
(45) Date of Patent: Oct. 20, 2009

(54) ROBOTIC GESTURE RECOGNITION SYSTEM

(75) Inventors: Larry Venetsky, Mount Laurel, NJ (US); Jeffrey W. Tieman, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 11/586,750

(22) Filed: Oct. 5, 2006

(65) Prior Publication Data

US 2008/0085048 A1    Apr. 10, 2008

(51) Int. Cl.
*G06K 9/00* (2006.01)

(52) U.S. Cl. .................... 382/153; 382/103; 382/104; 382/218; 702/141; 345/475; 348/207.11

(58) Field of Classification Search ............... 382/153, 382/103, 104, 218; 702/141; 345/475; 348/207.11
See application file for complete search history.

(56) References Cited

U.S. PATENT DOCUMENTS

| | | | | |
|---|---|---|---|---|
| 5,483,630 | A  * | 1/1996  | Unuma et al. | 345/475 |
| 5,963,712 | A  * | 10/1999 | Fujita et al. | 700/264 |
| 6,001,013 | A  * | 12/1999 | Ota | 463/7 |
| 6,075,895 | A  * | 6/2000  | Qiao et al. | 382/218 |
| 6,227,968 | B1 * | 5/2001  | Suzuki et al. | 463/7 |
| 6,335,977 | B1 * | 1/2002  | Kage | 382/107 |
| 6,571,193 | B1 * | 5/2003  | Unuma et al. | 702/141 |
| 6,681,031 | B2   | 1/2004  | Cohen et al. | |
| 6,941,239 | B2 * | 9/2005  | Unuma et al. | 702/141 |
| 7,015,950 | B1 * | 3/2006  | Pryor | 348/207.11 |
| 7,330,566 | B2 * | 2/2008  | Cutler | 382/103 |
| 7,340,100 | B2 * | 3/2008  | Higaki et al. | 382/199 |
| 2001/0008561 | A1 | 7/2001 | Paul et al. | |
| 2002/0126876 | A1 | 9/2002 | Paul et al. | |
| 2003/0208335 | A1 * | 11/2003 | Unuma et al. | 702/141 |
| 2004/0228503 | A1 * | 11/2004 | Cutler | 382/103 |
| 2005/0141997 | A1 * | 6/2005  | Rast | 416/229 R |

OTHER PUBLICATIONS

Aggarwal & Cai, "Human Motion Analysis: A Review", Nonrigid and Articulated Motion Workshop, IEEE Proceedings, 1997 pp. 90-102.
Davis & Bobick, "A Robust Human-Silhouette Extraction Technique for Interactive Virtual Environments", Proceedings of the International Workshop on Modelling and Motion Capture Techniques for Virtual Environments, 1998, pp. 12-25.
Bradski, "Computer Vision Face Tracking for Use in a Perceptual User Interface", Intel Technology Journal, vol. 2, Issue 2, 1998.

* cited by examiner

*Primary Examiner*—Brian Q Le
*Assistant Examiner*—Aklilu k Woldemariam
(74) *Attorney, Agent, or Firm*—Mark O. Glut; Mark D. Kelly

(57) ABSTRACT

A gesture recognition system enabling control of a robotic device through gesture command by a user is provided, comprising a robotic unit, a video or infrared camera affixed to the robotic unit, computing means, and high and low level of control gesture recognition application code capable of enabling the system to locate points of left hand, right hand, upper torso and lower torso of the user in the video imagery and convert it to waveform data, correlate the waveform data to user command data, and form corresponding control voltage command(s) for production of electric current voltage(s) to drive one or more of the electric motors or actuators of the robotic device to thereby control same. In addition, a computer software program is provided for use in the gesture recognition system described above.

11 Claims, 25 Drawing Sheets

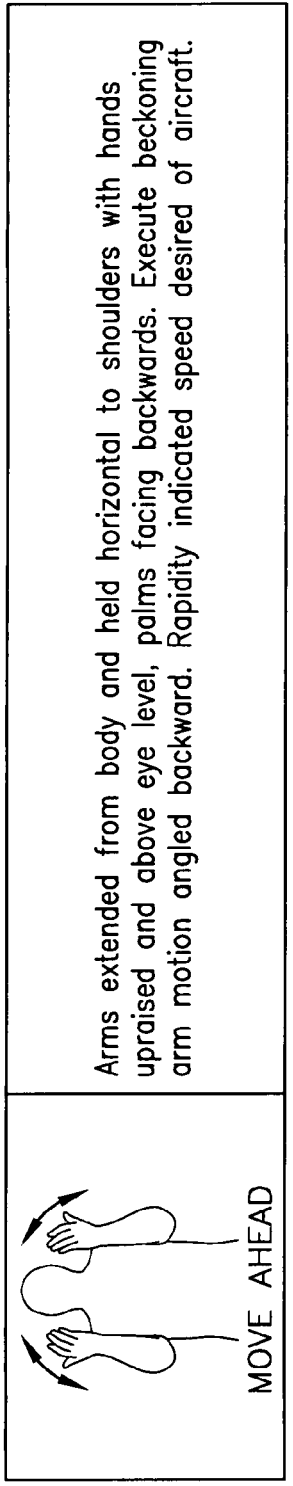

MOVE AHEAD

Arms extended from body and held horizontal to shoulders with hands upraised and above eye level, palms facing backwards. Execute beckoning arm motion angled backward. Rapidity indicated speed desired of aircraft.

FIG-3a

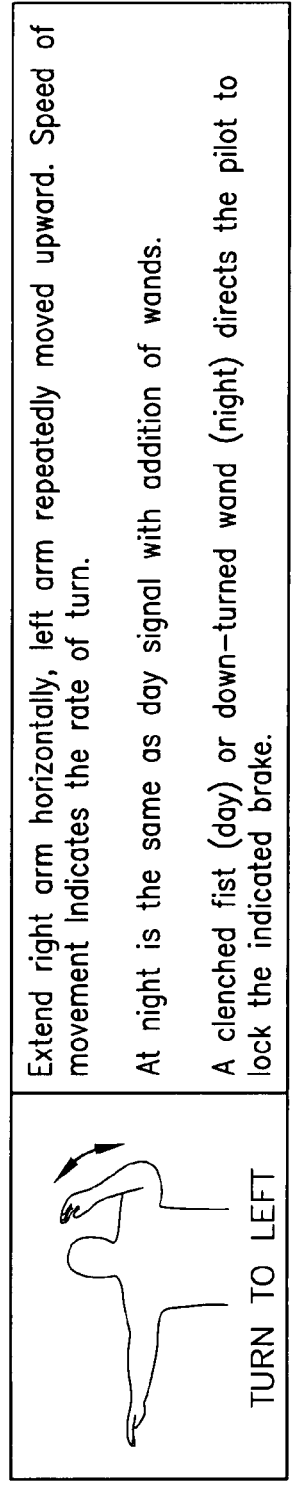

TURN TO LEFT

Extend right arm horizontally, left arm repeatedly moved upward. Speed of movement Indicates the rate of turn.

At night is the same as day signal with addition of wands.

A clenched fist (day) or down-turned wand (night) directs the pilot to lock the indicated brake.

FIG-3b

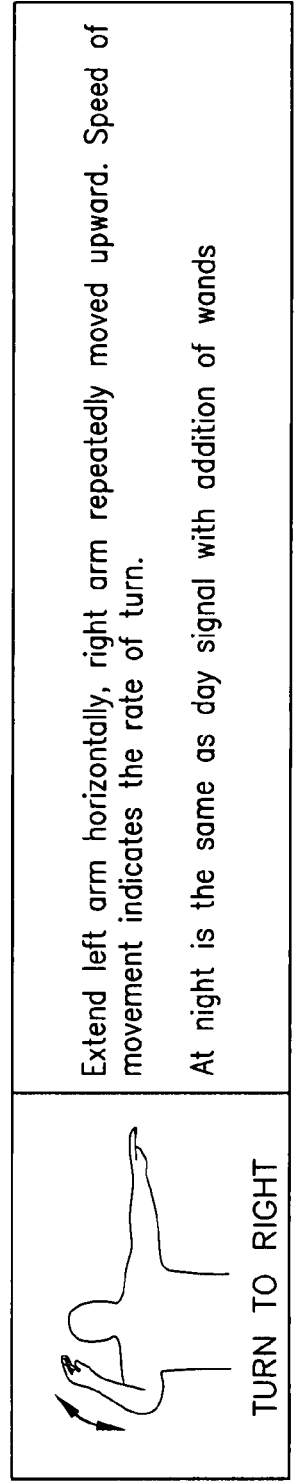

TURN TO RIGHT

Extend left arm horizontally, right arm repeatedly moved upward. Speed of movement indicates the rate of turn.

At night is the same as day signal with addition of wands

FIG-3c

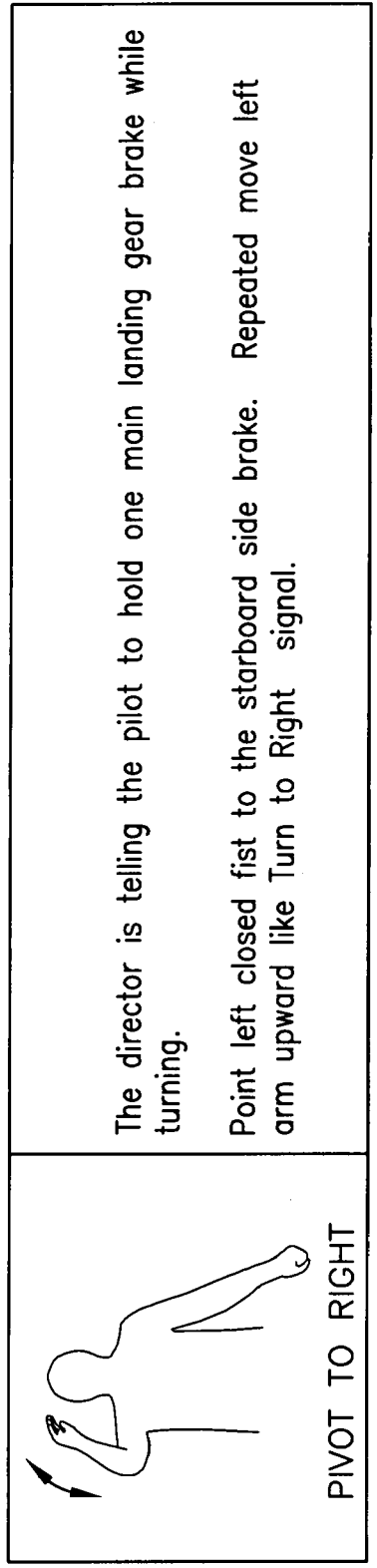

PIVOT TO RIGHT

The director is telling the pilot to hold one main landing gear brake while turning.

Point left closed fist to the starboard side brake. Repeated move left arm upward like Turn to Right signal.

FIG-3f

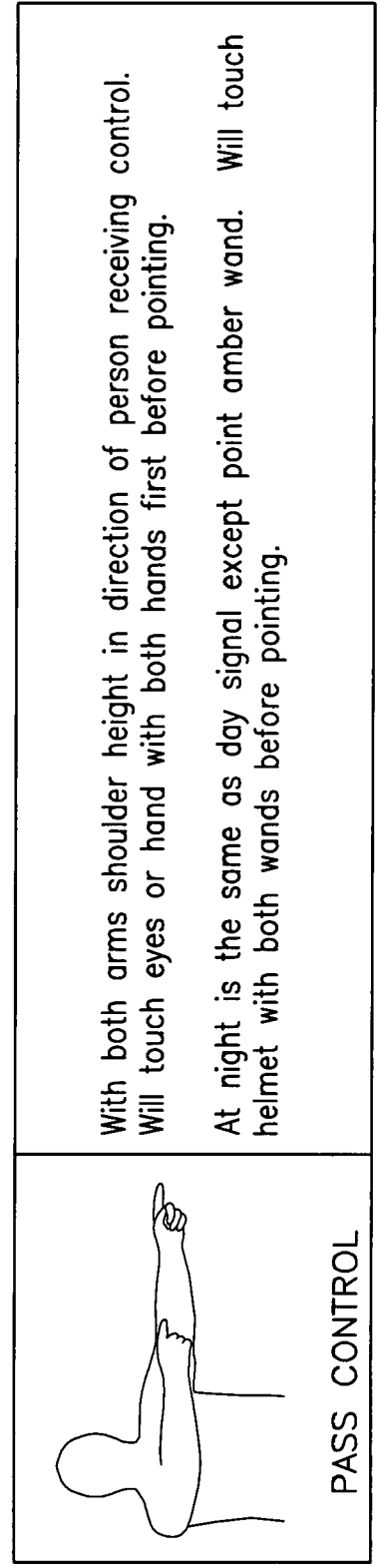

PASS CONTROL

With both arms shoulder height in direction of person receiving control. Will touch eyes or hand with both hands first before pointing.

At night is the same as day signal except point amber wand. Will touch helmet with both wands before pointing.

FIG-3g

Hold one hand open motionless and high above head, with palm forward.

At night is the same as day except with wand.

NOTE: Another signal for "I have command" seen during operations is tapping the chest with both hands. Sometimes the director will tap the chest, then raise one hand.

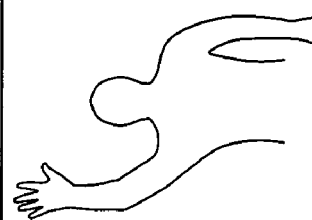

I HAVE COMMAND

FIG-3h

Arms down with palms towards ground. Then moved up and down several times.

At night is the same as day signal with addition of wands.

NOTE: This gesture may not be relevant to UCAV operations, since the UCAV is already expected to taxi slowly, not much faster than 3 mph.

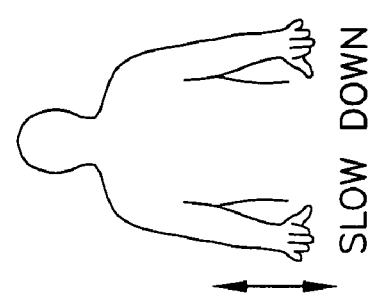

SLOW DOWN

FIG-3i

Arms crossed above the head, palms facing forward.

Same as day signal with addition of wands.

Emergency Stop (as opposed to "brakes on")

Arms by sides, palms facing forward, swept forward and upward repeatedly to shoulder height.

At night is the same as day signal with addition of wands.

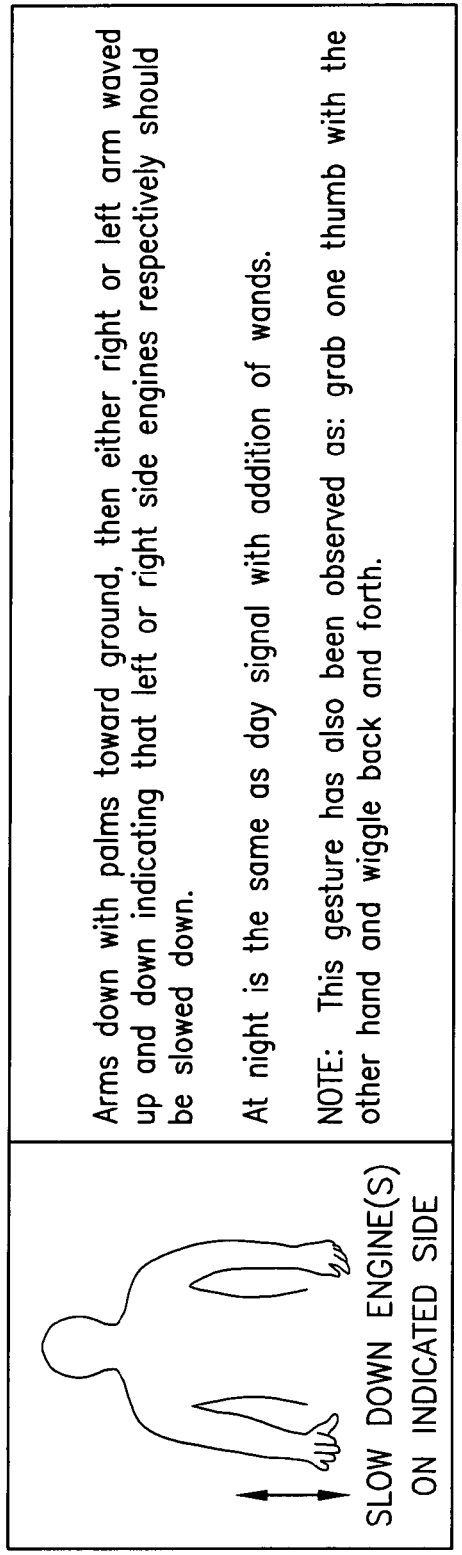

Arms down with palms toward ground, then either right or left arm waved up and down indicating that left or right side engines respectively should be slowed down.

At night is the same as day signal with addition of wands.

NOTE: This gesture has also been observed as: grab one thumb with the other hand and wiggle back and forth.

SLOW DOWN ENGINE(S) ON INDICATED SIDE

FIG-3l

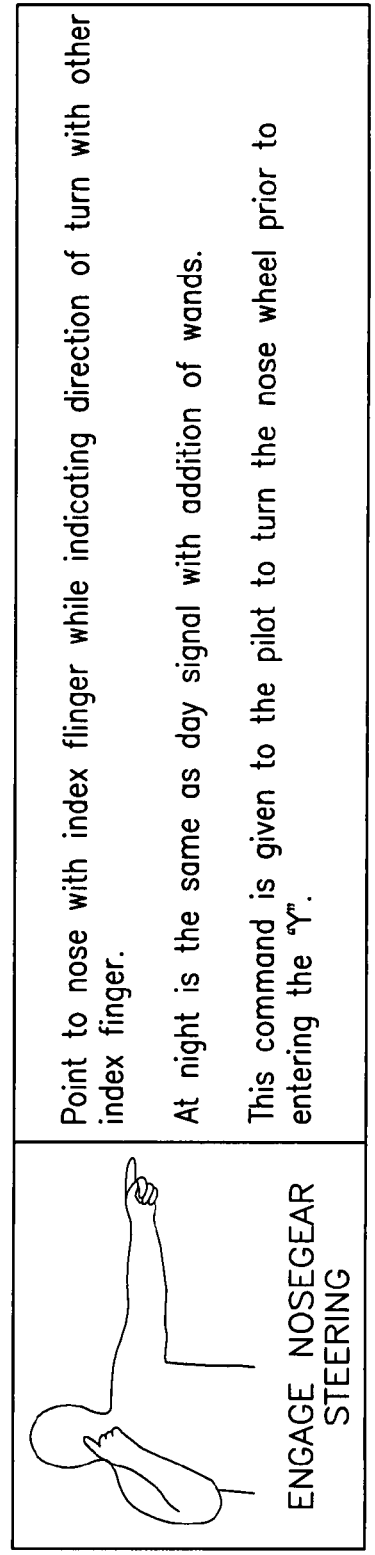

Point to nose with index flinger while indicating direction of turn with other index finger.

At night is the same as day signal with addition of wands.

This command is given to the pilot to turn the nose wheel prior to entering the "Y".

ENGAGE NOSEGEAR STEERING

FIG-3m

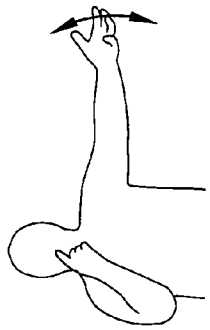

DISENGAGE NOSEGEAR STEERING — Point to nose with index finger, lateral wave with open palm of other hand at shoulder height.

At night is the same as day signal with addition of wands.

This command is given to the pilot prior entering the "Y".

FIG-3n

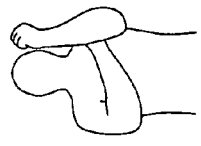

LAUNCH BAR UP — One arm down and supported above the elbow. Pivot it up.

FIG-3o

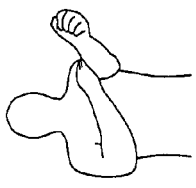

LAUNCH BAR DOWN — Support one arm under the elbow in point up position. Pivot it down.

FIG-3p

Right fist, thumb extended downward, lowered suddenly to meet horizontal palm of left hand.

At night is the same as day signal with addition of wands.

DOWN HOOK

Arms straight out at sides then swept forward and hugged around shoulders.

At night is the same as day signal with addition of wands.

FOLD WINGS/ HELICOPTER BLADES

ROBOTIC GESTURE RECOGNITION SYSTEM

STATEMENT OF GOVERNMENT INTEREST

The invention described herein may be manufactured and used by or for the Government of the United States of America for governmental purposes without the payment or any royalties thereon or therefor.

FIELD OF THE INVENTION

A gesture recognition system is provided for enabling video recognition of a user's gestures, and transformation thereof to commands capable of being received and responded to by a robotic device. In addition, a computer software is provided for use in the system herein.

BACKGROUND OF THE INVENTION

Several approaches have been made to perform recognition of human motion, with emphasis on real-time computation. In addition, several survey papers have reviewed vision-based motion recognition, human motion capture, and human-motion analysis. The most frequently used methodology for recognition of body motion and dynamic gestures was based on the analysis of temporal trajectories of the motion parameters, hidden Markov models and state-space models, and static-activity templates.

Other conventional techniques have attempted to represent motion to describe an action sequence by collecting of optical flow over the image or region of interest throughout the sequence, but this is computationally expensive and often was not robust. Another conventional technique combined several successive layers of image frames of a moving person in a single template. This single template represented temporal history of a motion, allowing a match of actual imagery to a memorized template to produce recognition of a motion gesture.

Further, all of the above conventional techniques have been conducted in controlled laboratory environments, with fixed lighting and constant distance to the subject. Obviously, actual field conditions will present external stimuli, and resulting difficulties in recognition. Thus, it is apparent that different approaches are required for real-life applications outside of a lab, such as the flight deck of an aircraft carrier.

Flight deck operations are a "dance of chaos" with steam, constant motion, and crowding. These operations are conducted during day or night, and rain or snow, when visibility is extremely poor in the unforgiving maritime environment. Moreover, fleet operations are continually subject to reduced manning and resistance to change. It is desired that, in these kinds of conditions, Unmanned Combat Air Vehicles (UCAV) shall be launched from the flight decks of aircraft carriers.

In order to launch a UCAV from a flight deck, the UCAV must be controlled during taxiing somehow before takeoff, and after landing. Simply hooking a tow tractor to the aircraft has been considered, but was deemed too slow, especially since the aircraft are required to recover every 45 seconds and need to taxi out of the landing area for the next aircraft. Alternatively, providing the aircraft director/controller with a joystick to control the aircraft would tax his/her workload with an additional process, and would negatively impact training and operations.

Further, if the UCAV is to be controlled on deck using a joystick, the UCAV would necessarily be controlled vi radio (RF) link. However, a RF link from a control device to the UAV is undesirable because of the EMI (electromagnetic interference) intensive environment on the flight deck, and the EMCON constraints. Another alternative is a tethered connection, using a control device physically tethered to the UCAV. However, such a tethered connection may be potentially unsafe for the personnel on the deck during high tempo operations.

Just like manned aircraft, the UCAVs taxi before launch, after recoveries or during re-spotting. In the case of manned aircraft, flight deck controllers signal directions to pilots for taxiing the aircraft around the deck or airfield. It would be most desirable if these signals were used to develop an automatic taxiing system for unmanned aircraft as well. If such a system were developed, it would enable a seamless transition of UCAVs into naval aviation.

It is an object of the present invention to overcome the difficulties discussed above, and provide a system and software program for use in such a system to allow a user to remotely control a robotic device using merely gestures or motion signals.

Further, it is an object of the present invention to overcome the difficulties discussed above using a machine vision based approach, which would least impact operations and training and therefore held the most promise from the operational point-of-view.

It is another object of the present invention to provide a system as described above, using sensor(s) mounted on the robotic device, in conjunction with image recognition software residing on an onboard computer, to provide inputs to the robotic devices' control system.

SUMMARY OF THE INVENTION

In order to achieve the objects of the present invention, as discussed above, the present inventors have earnestly endeavored to create a computer controlled system to enable control of robotic devices by a human user using gestures and movements that can be recognized by the system, and cause the robotic device to react thereto. A gesture recognition system is provided comprising:

a robotic unit, with one or more electric motors or actuators, motor control amplifiers, power source, omni-directional wheels, gear boxes, vehicle body, chassis with suspension, electric wiring and cabling, control and power supply circuitry;

a video camera affixed to the robotic unit, said video camera capable of recording in pixel format, panning, tilting and zooming;

a high level of control gesture recognition application software implemented on a computer with an application for enabling recognition of dynamic gesture signals and static poses of a user in pixel space via video imagery recorded by the video camera;

(a) a high level computing means in communication with said video camera, said high level computing means capable of storing and running the high level of control gesture recognition application code to transform a users recognized gesture or movement in pixel space to waveform data, and generating user commands therefrom;

(b) a low level computing means in communication with the high level of control computing means and the robotic unit, said low level computing means capable of storing and running the low level of control gesture recognition application code to transform the user commands received from the high level of control computing means control voltage commands;

wherein said robotic unit is in communication with the low level computing means, said robotic unit capable of receiving and responding to the control voltage commands received from the low level computing means.

The present invention also provides the gesture recognition system with a robotic device further comprising panic buttons for manually overriding the gesture recognition system; and (a) the low level of control application code further comprises application code capable of monitoring states of switches on the panic buttons, and deactivating the gesture recognition system upon sensing activation of one or more of said switches.

The present invention also provides a gesture recognition system with further features comprising:

a computer display means in communication with the high level computing means; and a user input means in communication with the high level computing means and the low level computing means.

The present invention further provides a gesture recognition system with the feature of computer control that allows a user to override the computer application code by inputting direct user command data into the high level of control computing means and/or the low level of control computing means.

The present invention further provides a gesture recognition system with the feature wherein the video camera is capable of recording in the visible or infrared region.

The present invention also provides computer software for recognition of gesture or movement of a user, and transformation of the recognized gesture or movement to user commands and control voltage commands to remotely operate a robotic device, is provided, comprising:

(a) high level of control gesture recognition control for enabling recognition of dynamic gesture signals and static poses of a user in pixel space via video imagery recorded by a video camera as an input means comprising:

(i) application software capable of receiving images from camera in pixel frames coded in HSL or RGB formats;

(ii) application software capable of locating points of left hand, right hand, upper torso and lower torso of the user in the video imagery, and registering these points in pixel frame coordinates recorded on the video image frames;

(iii) application software capable of calculating a relative center point of a relative coordinate system, said relative center point being located at approximately the user's cranial region, based on the upper torso point and lower torso point in pixel frame coordinates;

(iv) application software capable of transforming the left hand point and the right hand point in pixel frame coordinates to a left hand point and right hand point in the relative coordinate system.

The application software for implementing the present invention also includes the capacity of controlling zoom, pan and tilt camera states; comparing the relative left hand point and relative right hand point of a previous video frame to the relative left hand point and relative right hand point of a current video frame, so as to transform the change on relative positions of the left hand points and right hand points to waveform data, and the capability of extracting dynamic and static features of movement of the user from the waveform data; and The low level of computer control of the present invention is capable of decoding the dynamic and static features by correlating the features to user command rules, and generating a user command therefrom; receiving the user command from the high level of control application code; determining current states of electric motors or actuators; calculating desired states of the electric motors or actuators based on the received user command; computing the errors between the current states of the electric motors or actuators, and the desired states of the electric motors or actuators; transforming said computed errors between the current states of the electric motors or actuator, and the desired states of the electric motors or actuators, into control voltage command(s) for production of electric current voltage(s) to drive one or more of the electric motors or actuators.

The low level of computer control of the present invention is capable of generating feedback messages to for display to the user, to inform the user of lack of or acquisition of control of the robotic device. The low level of computer control is also operable to allow a user to override the computer application by inputting direct user command data.

DETAILED DESCRIPTION OF THE INVENTION

Computer-human interface systems may require understanding of gestures as a means of input or control. Directing of Unmanned Air Vehicles (UAV's) during taxiing operations on carrier decks or airfields is such a case. There are numerous other applications for automatic gesture recognition as well. For example, if gesture recognition were available, it would be possible to automate many tasks in construction, such as crane operation while rigging construction elements in place, or control of underwater assembly robots by divers.

Further, understanding and recognizing human motion gestures is very desirable in tracking and surveillance, as well as training systems. In addition, entertainment applications may be used to analyze the actions of the person to better aid in the immersion or reactivity of the experience.

The present inventors endeavored to determine the feasibility of a gesture recognition system to control a robot device using only a video camera as an input means for controlling signals. Limited gesture lexicon was used to control a laboratory robot to perform controlled motions. All gesture recognition algorithms were based on pixel-to-waveform transformation, and these waveforms were used for further interpretation of the gesture signals.

Several gesture recognition methods were implemented and tested. In particular, a pure rule-based system, as well as a hybrid-rule system, based on neural network systems, were built to recognize the dynamic and static gesturing. The experiments included a system that used subsumption architecture to suppress currently active behavior by another one. The subsumption was triggered by an urgent condition to force a new action (i.e. immediate stop) when necessary. As a result of this research we were able to control laboratory robot in real time using dynamic gesturing as well as static posturing depending on required robot motion.

System Overview

Figure 1:
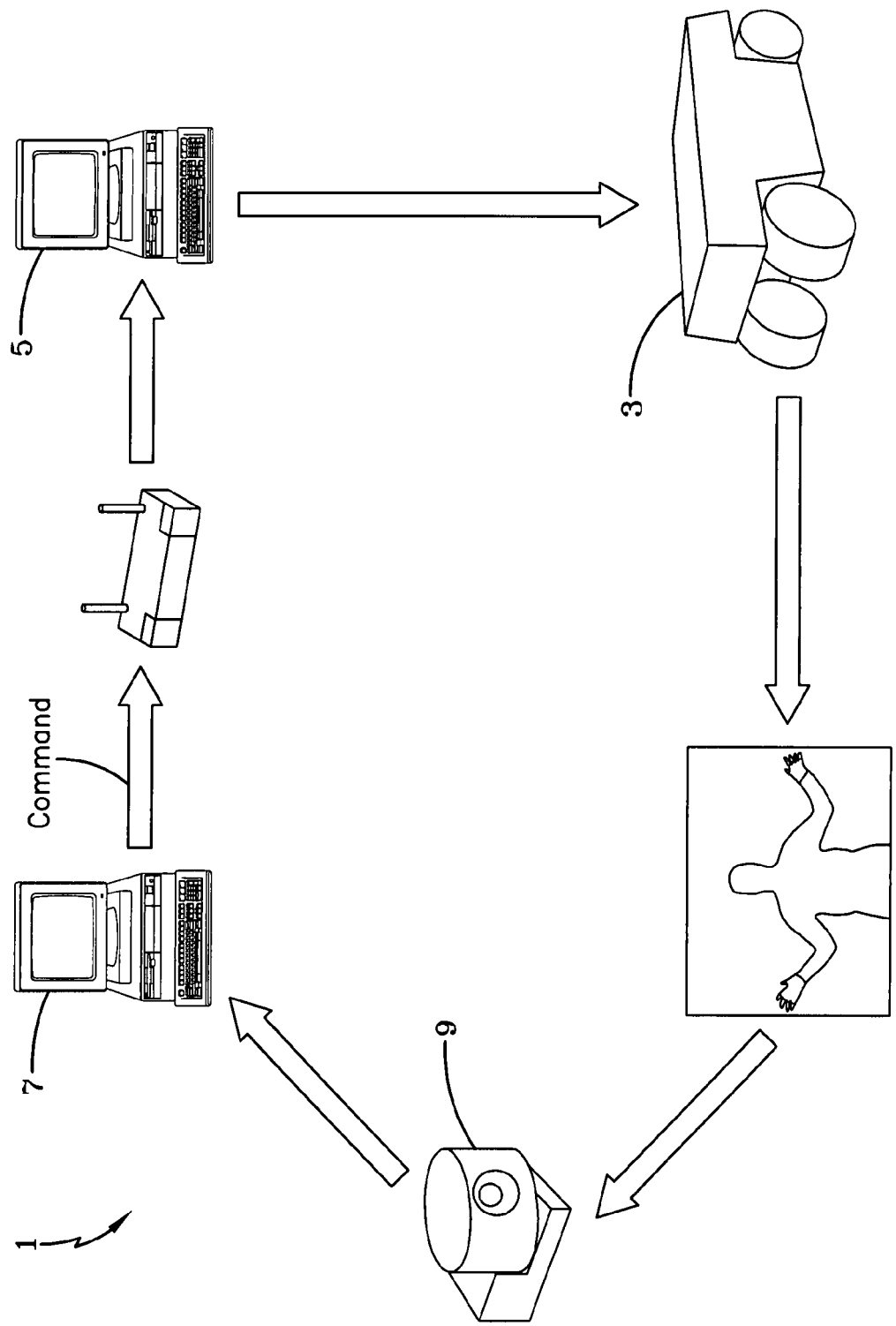
FIG. 1 is an illustration of one embodiment of the gesture recognition system enabling control of a robotic device through gesture command by a user.

The system 1 of the present invention uses hand gestures to control a robotic device 3, as shown in FIG. 1. In particular, as described in the first embodiment of the present invention, the system 1 consists of high level of control computer 7, video camera 9, a low level of control computer 5, and a robotic device 3. The high level of control computer 7, running the high level of control gesture recognition application code of the present invention, receives imagery data from the video camera 9, filters the data emphasizing the target points to search and track, finds the three important points (X and Y coordinates) from the regions of interest, transforms pixel space data into waveform data, and discards bad data. To address day/night/all weather operations for the real-life systems it is necessary to implement Infrared Video Data Acquisition (IVDA). The IVDA would require both camera and a set of markers to work in the infrared spectrum of light. Infrared markers should be placed on human controller in the important points such as cranial, lower torso and both hands. The power supply with the control circuitry could be placed on the controller belt around the waist. A robotic device (such as J-UCAS) in this case would use infrared camera that outputs video frames in gray scale instead of RGB or HSL formats. Optical filters would enhance the data by suppressing possible data noise present in the imagery even before the light is converted to electrical signals in the camera. Any data noise that was not filtered by the optical filtering could be filtered by digital signal processing means. To make the overall system work with taxiing deck operations the cranial and torso markers should be frequency modulated. The frequency modulation would serve two purposes. First it would help to detect a controller within the possible infrared noisy data. Since noise does not beacon it is clear that beaconing signal belongs to a human controller. Second it is possible to indicate an "active" controller with a specific frequency. It is important because deck operations are done with multiple aircraft and multiple controllers. Each controller can have different frequency infrared markers. If a robotic device is tuned to 5 HZ beacons it will ignore another controller with 10 HZ beacons that may work with another J-UCAS at the same time.

The high level of control computer 7, running the high level of control gesture recognition application code of the present invention, then translates the coordinates in pixel coordinates of the important points to relative coordinates, with reference to the center point, extracts features from the waveforms, determines a motion decision, sends the user command to the low level of control computer 5.

Figure 2:
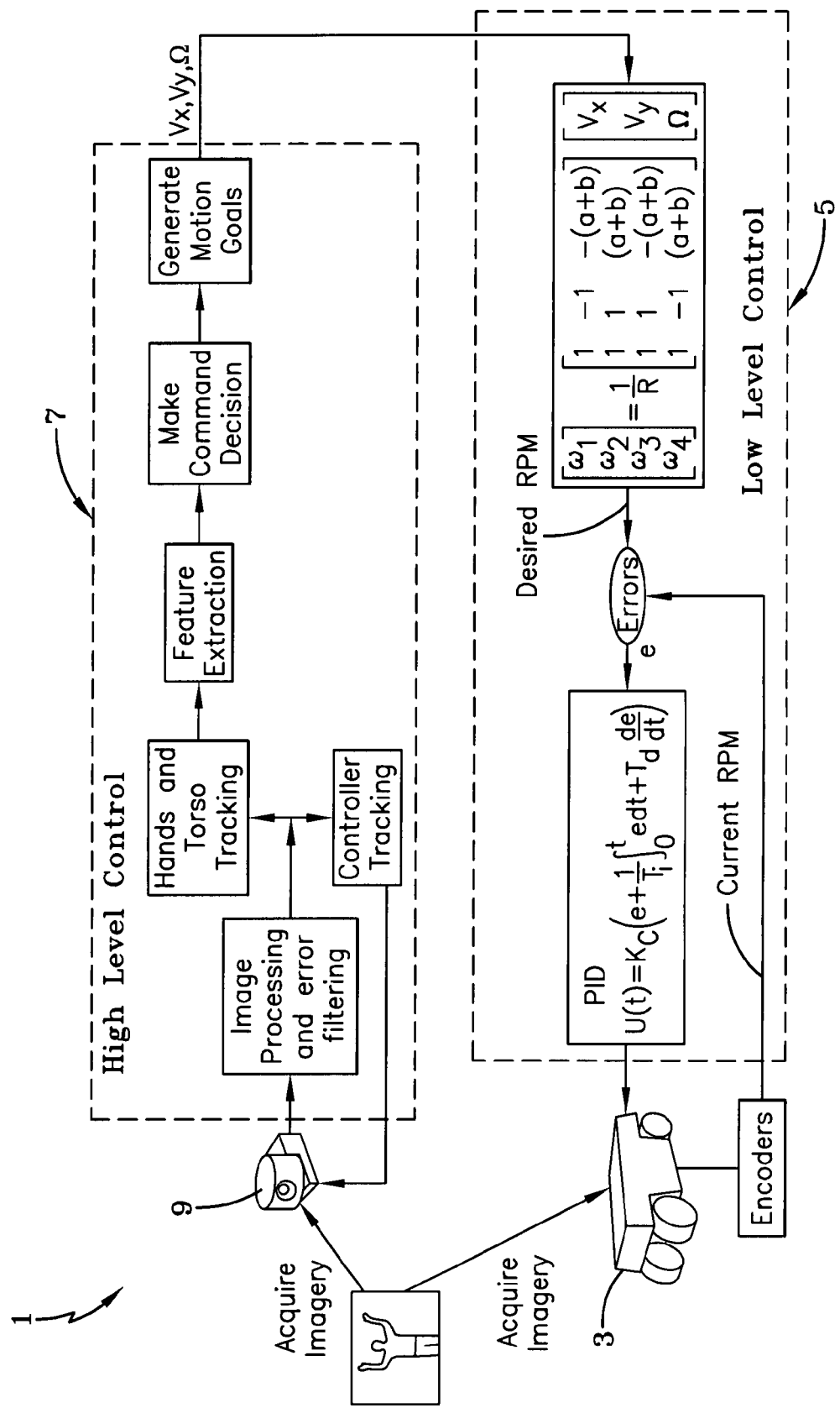
FIG. 2 is an illustration of the entire Gesture Recognition System that combines hardware components and software functional blocks illustrating overall working principle and data/information flow of the Gesture Recognition System
Figure 3D:
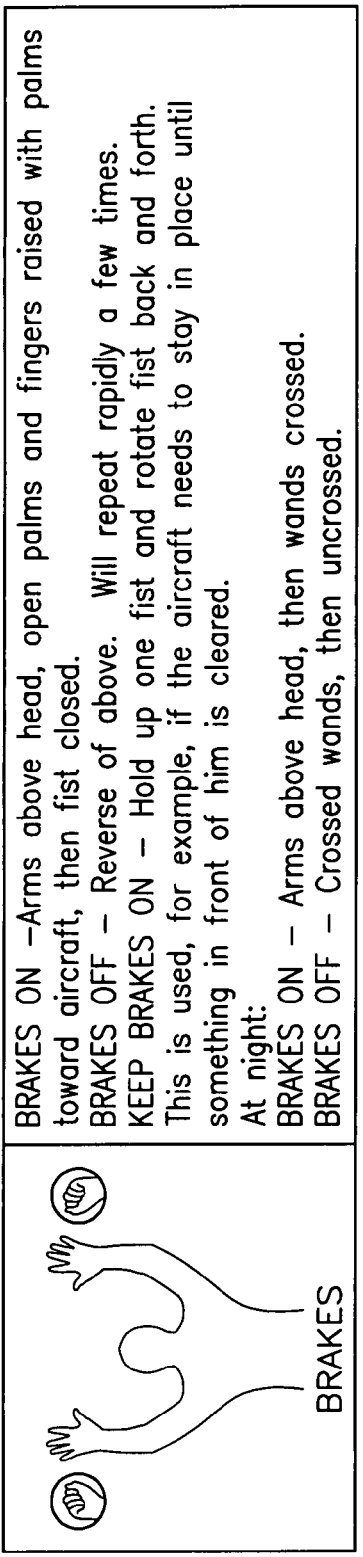
FIGS. 3a-3e are illustrations of "move forward", "turn left", "turn right", "brakes on or off" and "pivot" commands as described in NATOPS manual NAVAIR 00-80T-113. These gesture signals are used in Taxiing Operations on decks of aircraft carriers.
Figure 3E:
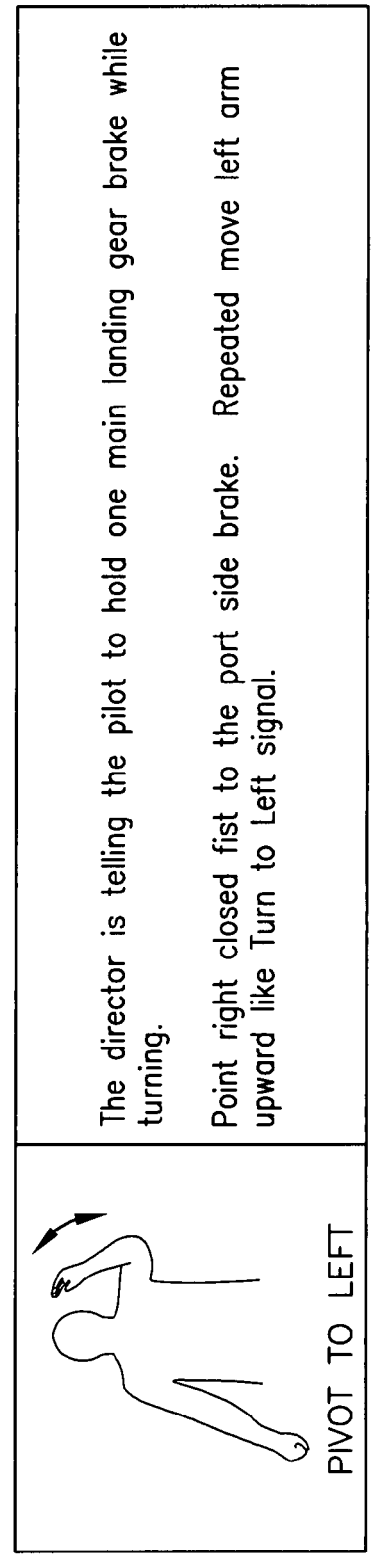
Figure 3J:
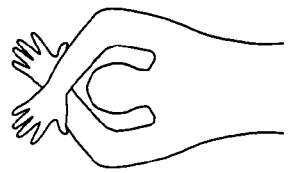
FIGS. 3f-3t illustrate additional gesture signals.
Figure 3K:
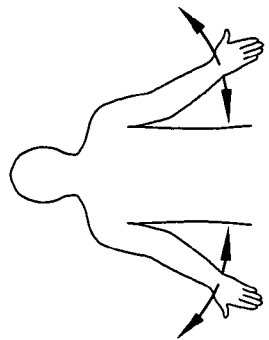
Figure 3Q:
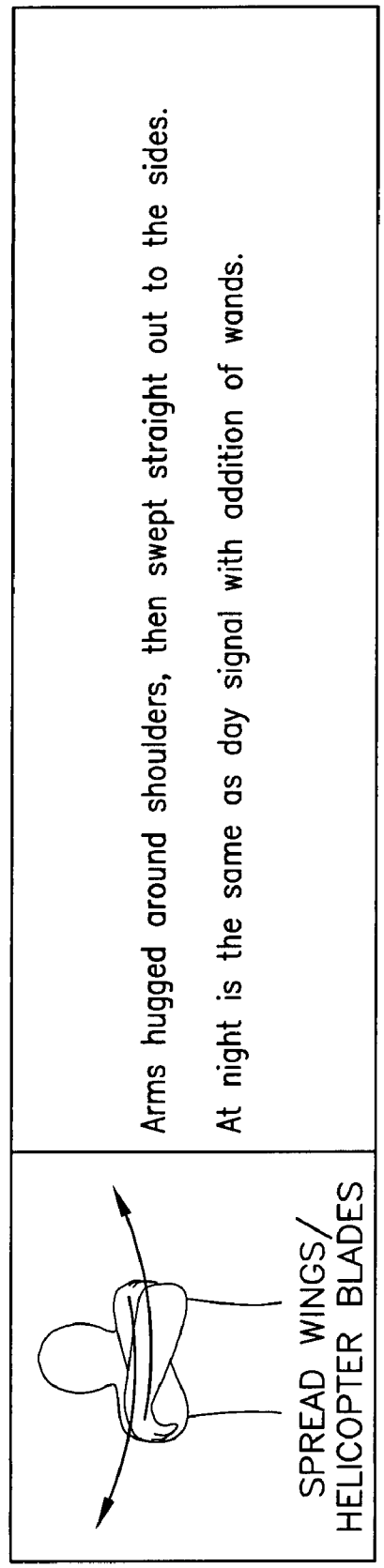
Figure 3R:
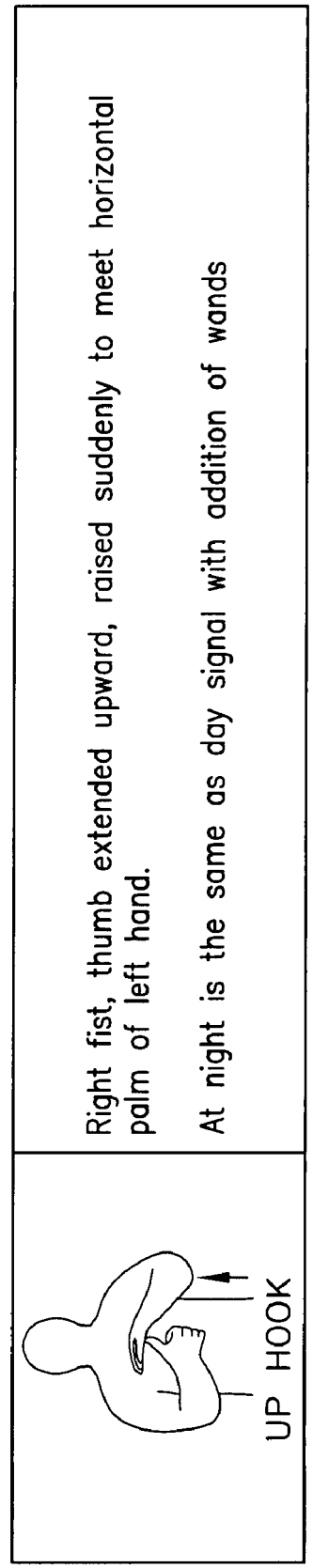
Figure 3S:
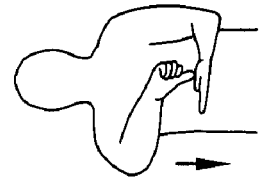
Figure 3T:
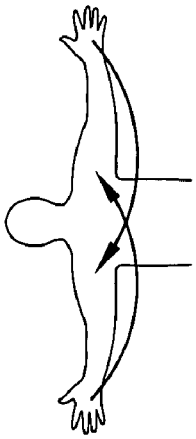
Figure 4:
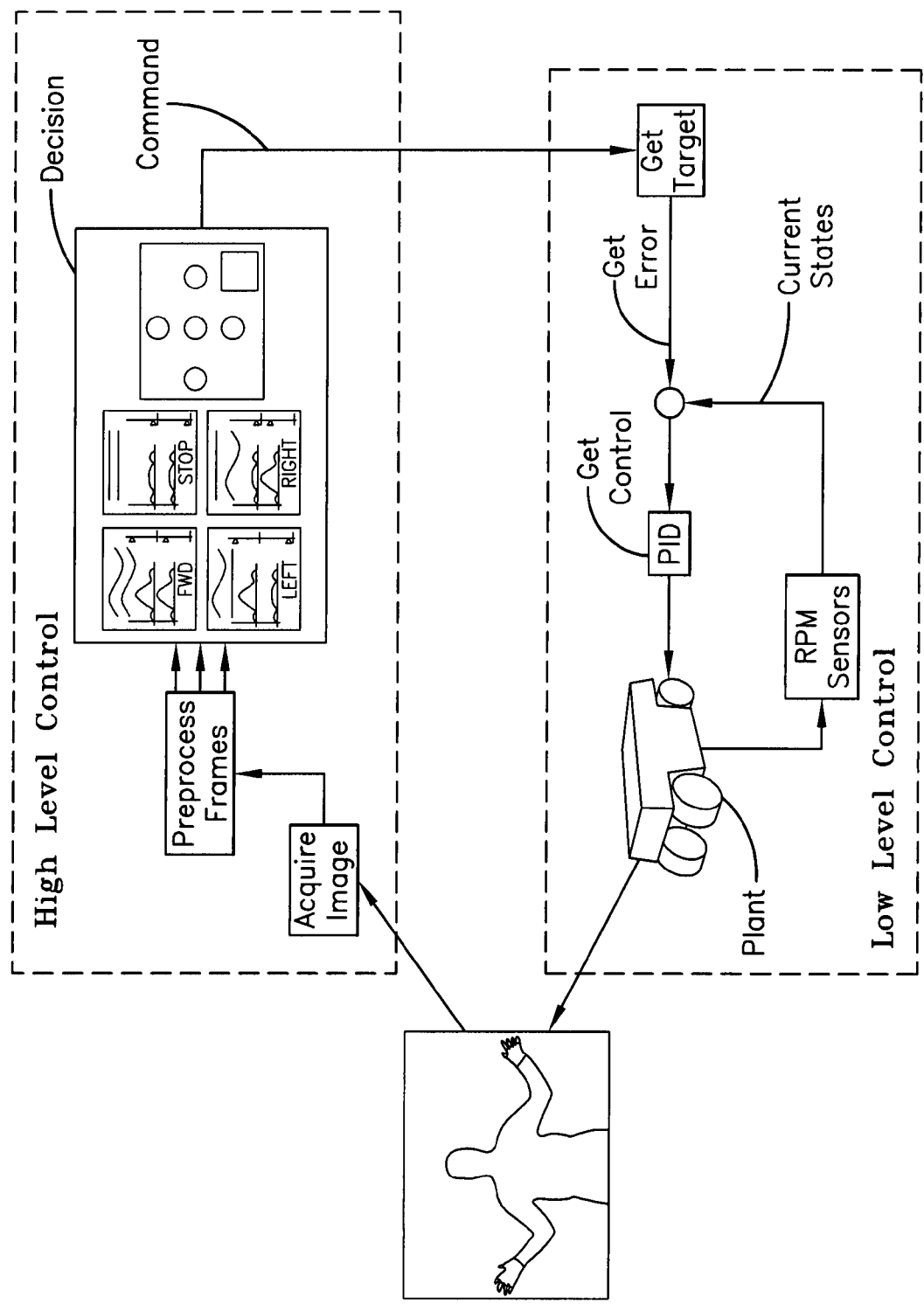
FIG. 4 is a diagram of high level control and low level control components of the gesture recognition system of the present invention.

The low level of control computer 5, as shown in FIGS. 1 and 2, receives the user command from the high level of control computer 7. The low level of control computer 5 then uses this command to assign target states for all four wheels of the robotic device 3. In the case of a UCAV, the low level of control computer 5 may control the flaps, engine, wheels, etc., so as to properly control the movement of the UCAV.

The low level of control computer 5 then computes control errors by monitoring and determining the current wheel states, flap states, etc., and desired target states. After the errors are known, the low level of control computer 5 drives the errors to zero by proportional control applied to all power amplifiers, which control the motors.

As shown in FIGS. 3a, 3b, 3c, 3k, 3h, 3g and 3d, respectively, the high level of control system has a vocabulary of seven commands: forward, left, right, reverse, have control (enable), disable, and stop. When using the system of the present invention, generally, the controlling director wears a light colored shirt (yellow, for example), a cranial cap with dark goggles and dark gloves. Further, the controlling director stands so that his chest is approximately in the center of the cameras field of view, without any significant rotation with respect to the camera. However, rotation, shift and scaling problems for reliable gesture recognition have been minimized by the present computer program.

Proper classification of dynamic gestures uses static, as well as dynamic, information contained in gestures to provide reliable classification. For example, a single snapshot of the "move forward" command is nearly identical to "stop" (hands at face level, about 1 to 2 fist widths from the head). Taken in time, however, it can be seen that the "move forward" is dynamic while "stop" is static. Thus, the software and system herein can recognize that, with the "stop" command, the hands at face level have not changed over two or more frames.

Second, the classification of dynamic gestures utilized by the computer software of the present invention is general enough to combine different styles of signals in one class, if they mean the same command. Third, the code of the computer software of the present invention is capable of distinguishing between two different gestures looking almost the same, but meaning different signals.

The computer software of the present invention achieves the above effects by searching for the three relevant points, and then storing their locations as pixel locations in the video frame. If data is missing or wrong, the system of the present invention will compensate for this lost or corrupted data by predicting their proper values. The hand locations are then normalized to the head location, to compensate for camera or director movement.

The normalized hand points are then split into 2 one-dimensional locations (x and y coordinates), and stored in a hand-specific and dimension-specific history array. Since human gestures that are not static tend to be sinusoidal in nature, each of the 4 arrays is converted to a waveform, and critical information such as frequency, phase and amplitude is extracted. This transformation from pixel domain to the waveform characteristics domain leads to a huge payoff—data reduction and convenient data representation for elegant classification in real time.

The position of hands, amplitude, phase and frequency are major features that are analyzed by the computer software of the present invention for class indicators of gesture signals. A selection of class indicators that identifies a command across all styles of the same command is called generalization. It allows for grouping of various styles of signals in to the same class. For example, two hands positioned below, above or on the level of head, and waved in 180-degree phase manner, are used to signal: "move forward".

Therefore, hands position in the Y-axis cannot not be used as a class indicator. However, if we considered the phase of these waveforms, combined with a rather large amplitude in the X-axis, and a rather small amplitude in the Y-axis, and also approximately equal distance between the hands in the X-axis during the gesturing, the computer software determines that these characteristics are unique characteristics for the "move forward" class of gestures.

The command interpretation mechanism considers only unique class indicators pertinent to a specific class of gesturing. For instance, with the gesture commands "move forward" and "slow down", both gestures are valid when hands are positioned below the head. Both gestures are motioned in a 180-degree phase manner, and could have the same frequency. In this case, too much generalization could work against reliable classification. Hence, the class indicator space must use necessary and sufficient characteristics (higher dimensionality) to reduce generalization. In this case, it is necessary to add to a decision mechanism, for example, the amplitudes in Y-axis for both hands, because this indicator distinguishes both commands on the indicator space.

Acquisition and Background Suppression

Figure 5:
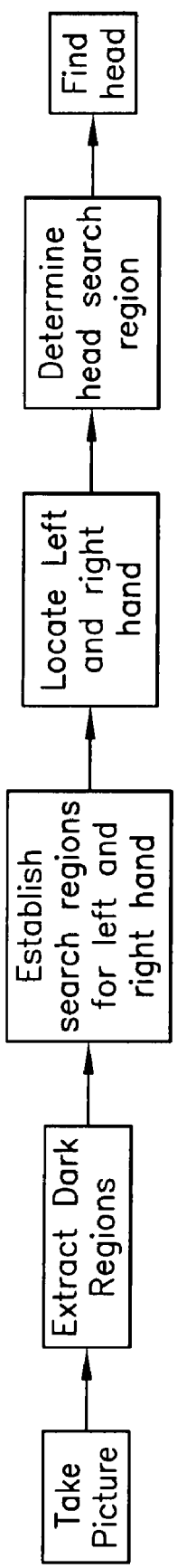
FIG. 5 is a flow diagram illustrating how a picture is acquired and critical points identified by the high level control of the gesture recognition system of the present invention.

Before any processing of the acquired video imagery can be performed by the high level of control computer running the computer software of the present invention, a picture must be acquired and critical points identified. This process, as shown in the flow diagram illustrated in FIG. 5, is termed an acquisition phase. Grayscale, mono-vision imagery can be used, as well as color imagery with stereovision information. Naturally better performance is expected because of more capable data acquisition.

For example, with grayscale, the video camera/acquisition board takes a grayscale image of the gesturing subject. Since grayscale assigns a value of 0-255 for each pixel, with 0 being black, multiplying every pixel by 4 will white out most of the image. By changing the contrast of the image to 90, small non-black areas can be filtered out. The next step is to establish search regions for the left and right hands. Since none of the gestures in our limited vocabulary involves hand crossovers (left hand on the right side of the body or vice versa), it is assumed that each hand will be on its respective side of the head.

Figure 6:
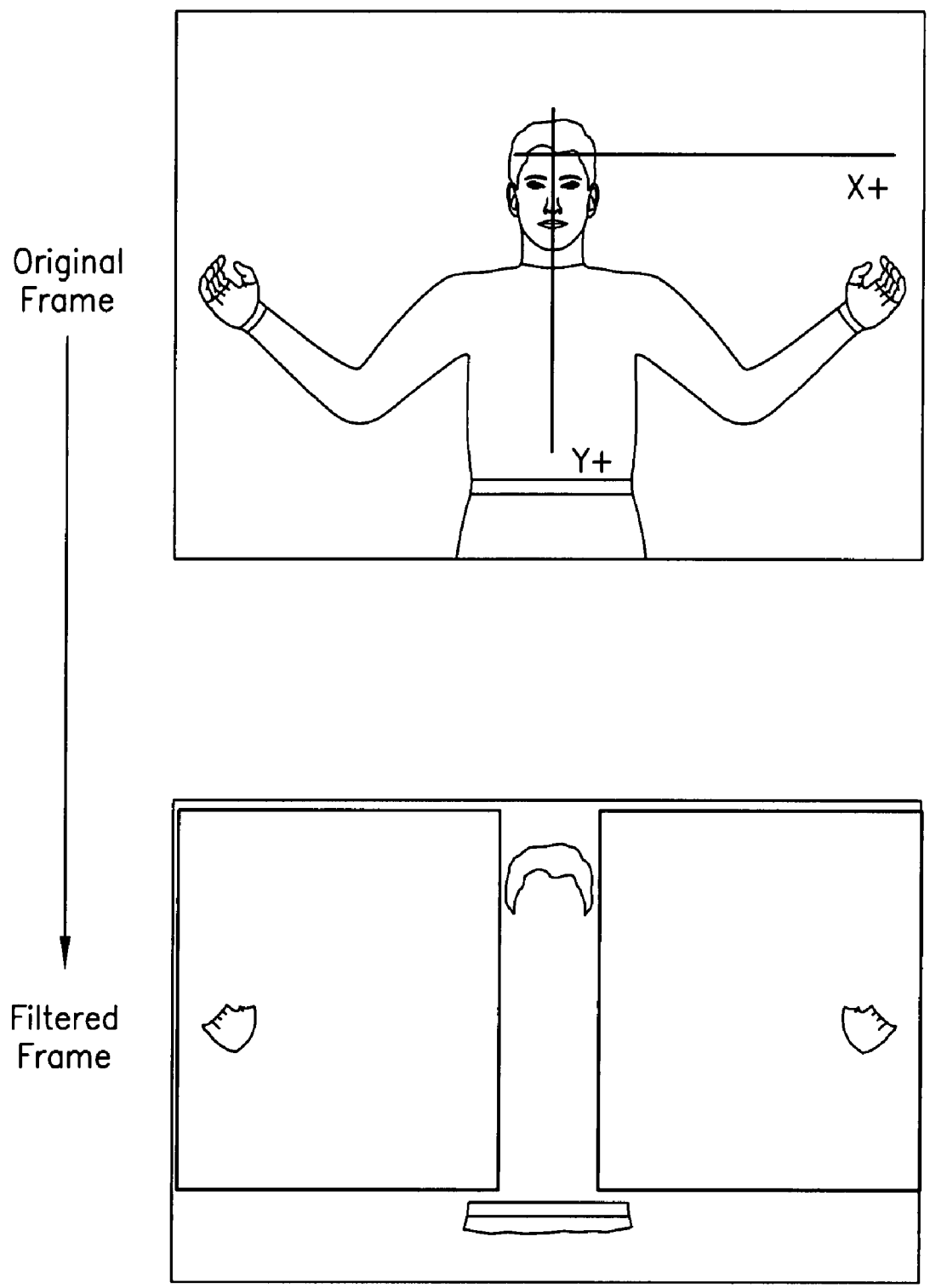
FIG. 6 is a sample image of a user taken by the gesture recognition system of the present invention, illustrating the step taken by the computer program of the present invention in defining the left and right search regions.

Since the head has not yet been identified, the head point from the previously identified image is used. In order to keep the primitive search algorithms from confusing the edges of the head with the hands, a small offset is subtracted from the search region. FIG. 6 shows a sample image with the left and right search regions. Note that the search regions do not meet in the center, but are offset to keep the head from being included. Once the search regions have been established, the left and right hand are found.

Figure 7:
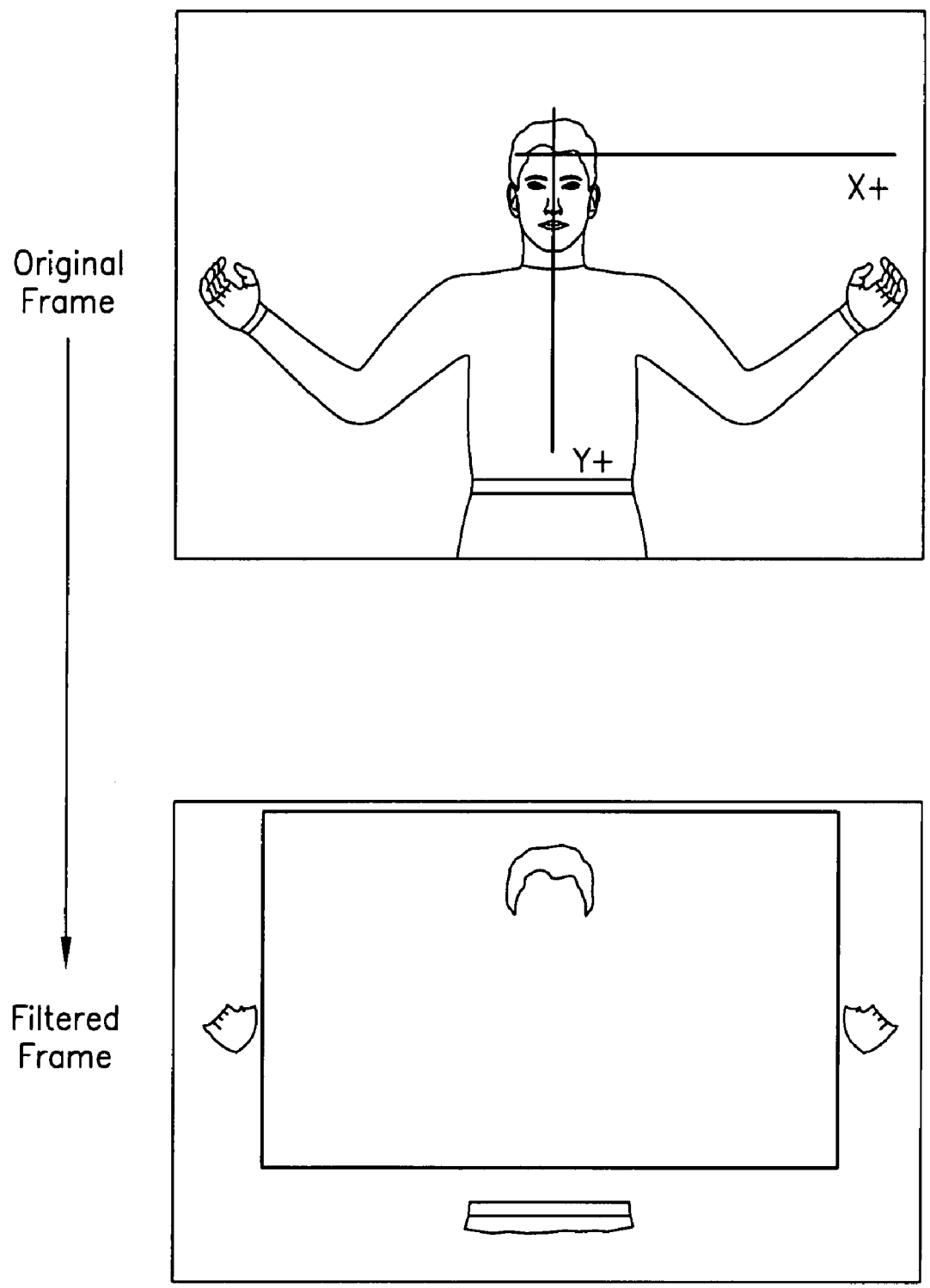
FIG. 7 is a sample image of a user taken by the gesture recognition system of the present invention, illustrating the step taken by the computer product in defining the head (center) search region.

Once the hands are found, the head must be located on X-Y space as well. A search region for the head is defined as the area between the hands. FIG. 7 shows a sample image with the head search region. As with the hands, once the search region is determined, the head is then easily found. The cycle of using the head to find the hands, followed by using the hands to find the head, can never start without an external initialization. Therefore, until a head point is found, a small region in the center of the image is defined as the head search area. Once the head is found, left and right hand search regions can be established and the acquisition begins.

Pre-Processing

Since no acquisition is perfect, it is possible that the search algorithms may find the wrong point or not find any matching point. The problem of finding the wrong point is solved by setting the search regions where the points are expected to be, as described above, and by setting the match score high enough to exclude non desired points. However, this adds to the problem of not finding any points. The problem of imperfect data acquisition becomes even more pronounced when the target search and tracking algorithm for finding the importance gesturing points in space (head and hands) is not fast enough. This problem is solved by data analysis and error filtering methods.

Analysis of standard gesture control showed that frequency of command change could go as high as 2 signals per second. Thus, the minimum data history requirement is at least 0.5 seconds worth of data. From the experiments and observation of waveforms, the present inventors determined that, for reliable class-indicator extraction, at least twice as much historical data was needed as previously thought. Therefore, the system of the present invention maintains approximately 1 to 2 seconds worth of data, with sampling time varying anywhere from 0.10 to 0.17 seconds per sample (approx 5 to 10 samples per second). To simplify data handling, the buffer is fixed to constant 13 data points. This provides the necessary desired length of data history.

Raising the sampling rate to at least 50 samples per second (the higher, the better) improves overall system performance, perhaps even eliminating the necessity for error filtering. Three error filtering methods are generally used by the high level control computer in image processing (See FIG. 2) and are described in detail below. The first method is based on data delay to forecast the missing point(s). The second method uses a statistical approach to replace errors with statistically expected data. The third method uses a Least Mean Squares estimator to forecast the missing or bad data because of the video acquisition errors.

Data Delay Method to Filter Errors

In order to account for missing points, a delayed decision/point predication method is used, as shown in Equation 1 below. Instead of the current sample of points ($S_N$) being used to make a decision, all decisions are based off the previously sampled set of points ($S_{N-1}$). This allows $S_N$ to be used to predict where $S_{N-1}$ will be (has been), should the search algorithm not find a point at $S_{N-1}$. In the event a point is missed, $S_{N-1}$ becomes the average of the previous point and the next point, or $$S_{N-1} = (S_{N-2} + S_N)/2 \quad \text{Equation 1}$$

Figure 8:
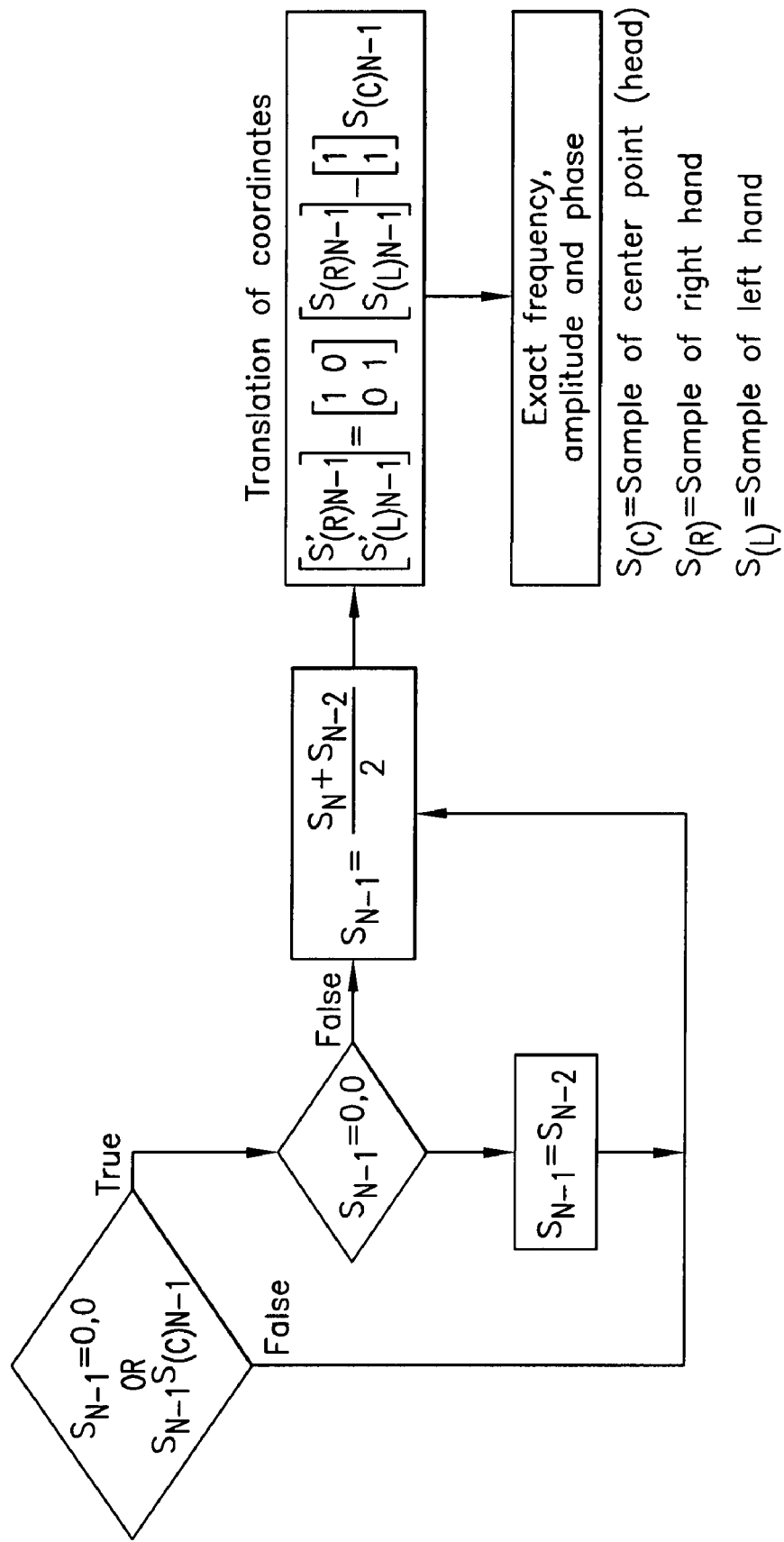
FIG. 8 is flow diagram illustrating the point prediction routine carried out by the computer software of the present invention.

In the event that both $S_{N-1}$ and $S_N$ are missing, $S_{N-2}$ is assigned to $S_{N-1}$ to keep the acquisition going. Once the location of the points has been determined (or predicted), the points are then normalized to the head or "center" point—$S'_{(C)N-1}$, as can be seen in Equation 2 below.

$$\begin{bmatrix} S'_{(R)N-1} \\ S'_{(L)N-1} \end{bmatrix} = \begin{bmatrix} 1 & 0 \\ 0 & 1 \end{bmatrix} \begin{bmatrix} S_{(R)N-1} \\ S_{(L)N-1} \end{bmatrix} - \begin{bmatrix} 1 \\ 1 \end{bmatrix} S_{(C)N-1} \quad \text{Equation 2}$$

Where $S_{(c)}$ is a sample of center point (head), $S_{(R)}$ is a sample of right hand, and finally $S_{(L)}$ is a sample of left hand and primed S (samples) are normalized to the center. In effect, the axis origin is moved from the computer defined upper left corner to the center point. This point is stored in a "waveform" that is axis and point specific (there are 4 waveforms—Left Y, Left X, Right Y and Right X). Since repetitive human motions tend to be sinusoidal, features such as amplitude, frequency and phase can be extracted for use in classifying the motion, by using a point prediction routine. The point prediction routine carried out by the algorithm of the present invention is illustrated in FIG. 8 and implemented by the high level computer control.

Statistical Method for Filtering Errors

The previously discussed method of error filtering is based on delaying the data for further data normalization, feature extraction and motion decision. The second method of error filtering, a statistical method, is implemented to eliminate the necessity for the time delay. In this method, previously collected data is used to judge the quality of the presently received data sample. The availability of data history permits the computation of several statistical characteristics to judge the quality of new data points. Namely, mean and standard deviation values for every data buffer are computed in real time for currently maintained set of samples.

Figure 9:
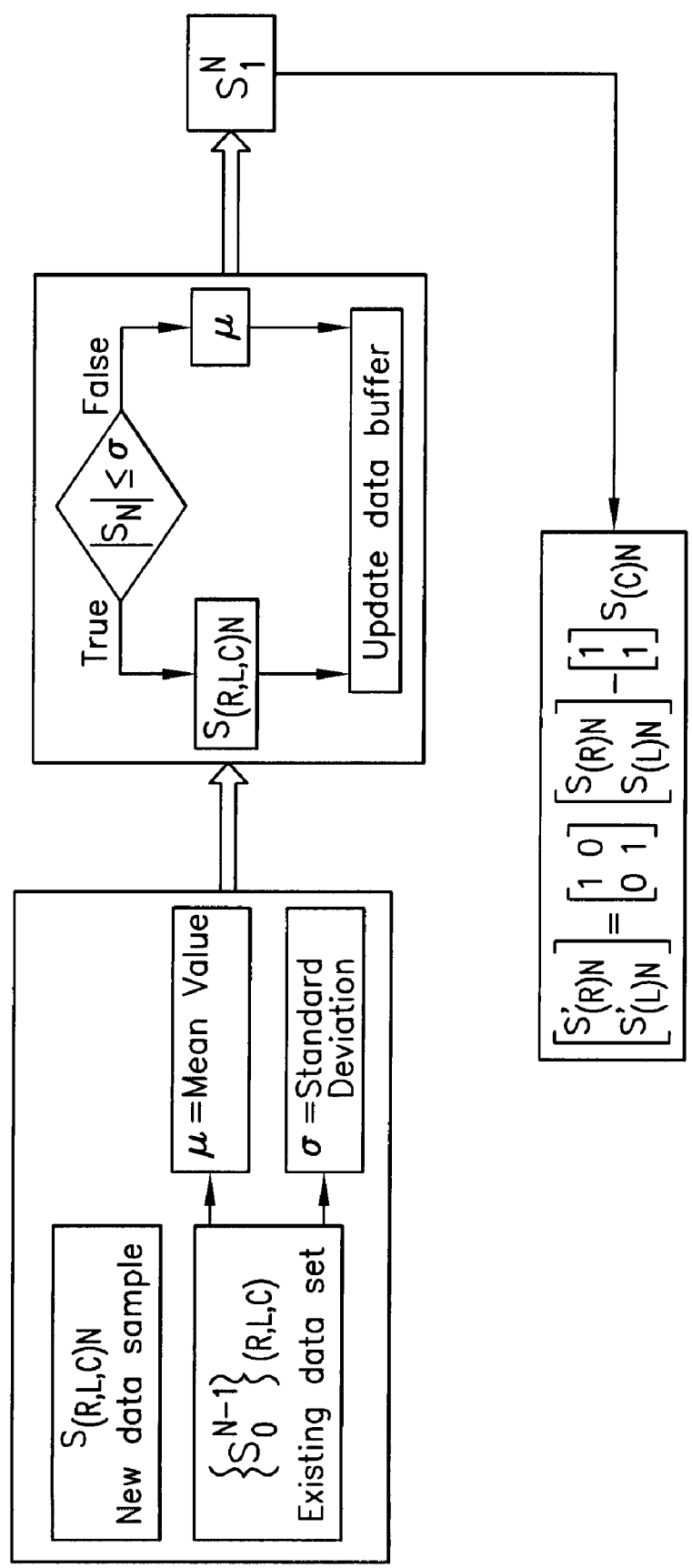
FIG. 9 is a flow chart illustrating the error filtering process to predict a missing or erroneous point.

As new data sample arrives at time N, it is checked for belonging to the set using standard deviation of the set. If the new data is within the limits of standard deviation, it is used to update the sample buffer. If it is outside of the standard deviation, it is rejected and the expected, mean value is used instead. FIG. 9 illustrates the algorithm and flow chart of this filtering process.

The Least Squares Estimate Method to Filter Errors

Overview

Given a vector of sample data Y containing N entries, it is desirable to determine if the next sample $y_{N+1}$ is in fact a correct sample or erroneous one. The method is based on statistical least-squares estimation to place a judgment on the next piece of data.

Using previously compiled data from time t=0 to t=N inclusively, the next point at time t=N+1 is estimated, then, by comparing the estimated value with the actual measurement at time t=N+1 when it finally has arrived, the error between the two values is computed. If the error is acceptable, the actual measurement is added to the list of samples Y. Otherwise, the estimated sample is used. This "one-step-look-ahead" method allows keeping outliers from affecting the data that is used for further decision making on gesture interpretation.

If small error thresholds are used to filter out the high value jumps or deep falls, this process effectively filters out the high frequency components in the data stream. It must be noted that selecting a very small threshold can be damaging to the overall system, because the system is not able to adjust to transition from one gesture to another, and will get trapped in the previous steady state. Hence, the value of the error threshold should be tuned for specific application. Generally, gesturing is performed at approximately 0-5 HZ interval. Therefore, it is relatively easy to select a good error threshold for the Least Squares Estimate, as described below.

Figure 10:
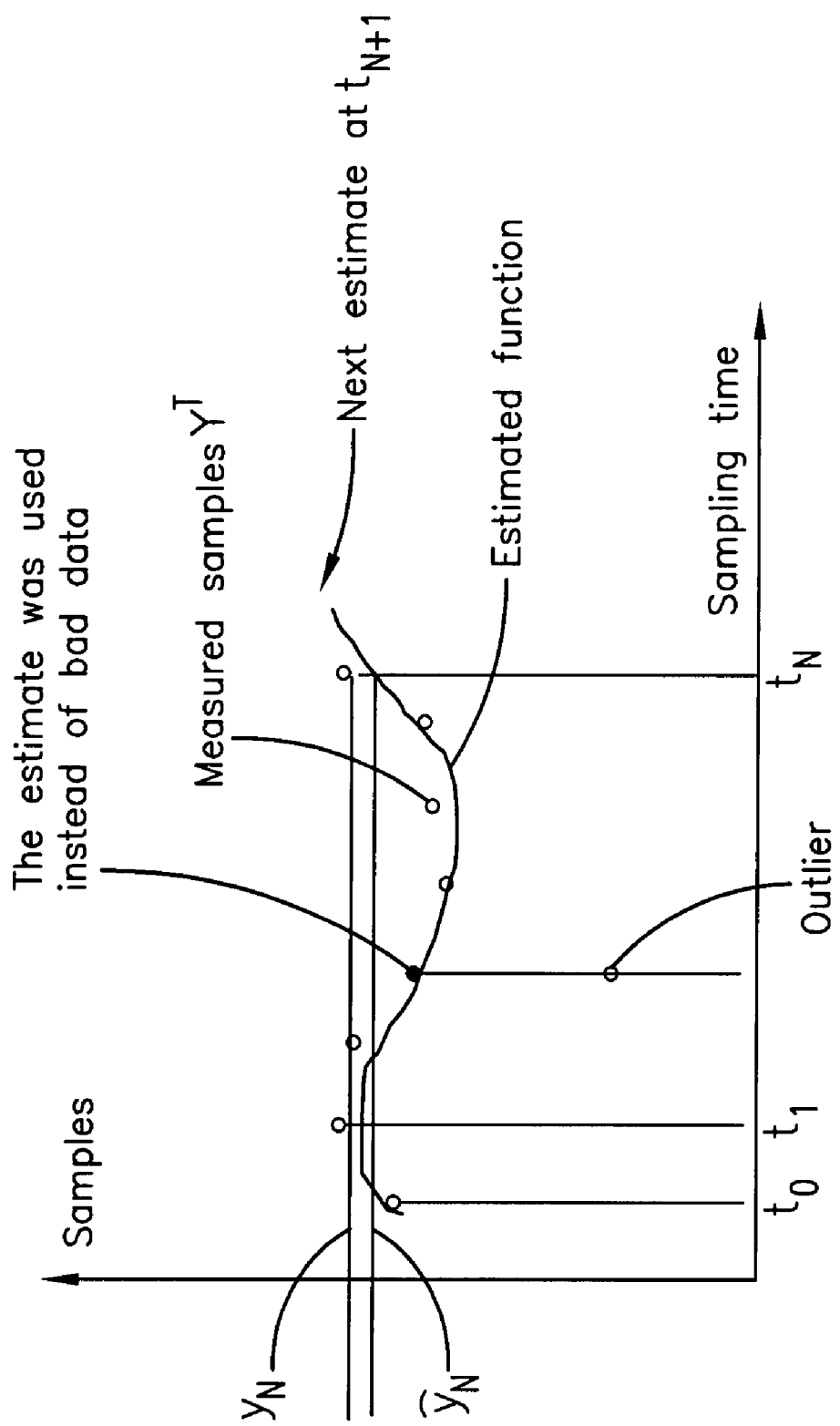
FIG. 10 is a graph illustrating the Least Squares Estimate method to filter errors during imagery sampling to predict a missing or erroneous sample point.
Figure 11:
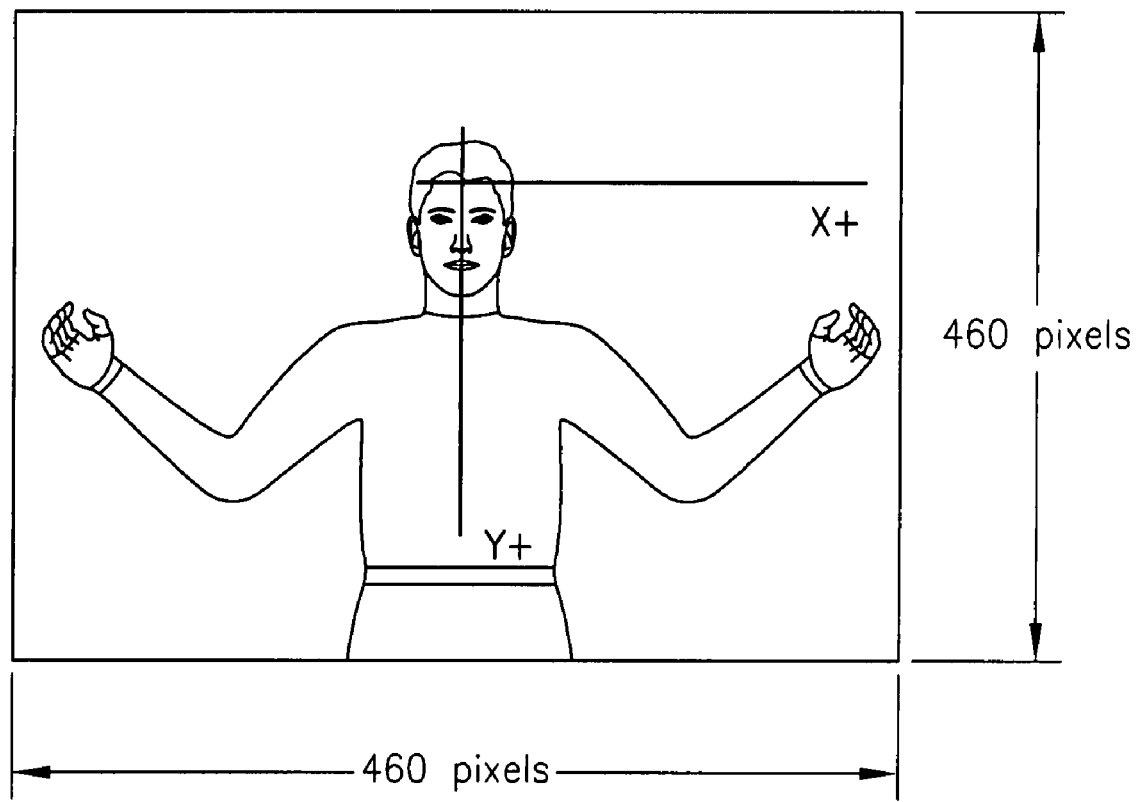
FIG. 11 is an image taken by the gesture recognition system of the present invention, illustrating the X-Y coordinates of a user.

Let two vectors $T^T = [t_0, t_1, t_2, \ldots, t_N]$ and $Y^T = [y_0, y_1, y_2, \ldots, y_N]$ be sampling time values and measurement data, respectively, as shown in FIG. 10, where N is a number of samples, defined as needed. Then, a system of linear. Equations B1, as illustrated below, is used to find coefficients $a_0$, $a_1$, $a_2$ that provide second order estimate for a function that guarantied a minimum least square fit shown, as illustrated in Equation B2 below.

$$\begin{bmatrix} \sum y_i \\ \sum t_i y_i \\ \sum t_i^2 y_i \end{bmatrix} = \begin{bmatrix} N & \sum t_i & \sum t_i^2 \\ \sum t_i & \sum t_i^2 & \sum t_i^3 \\ \sum t_i^2 & \sum t_i^3 & \sum t_i^4 \end{bmatrix} \begin{bmatrix} a_0 \\ a_1 \\ a_3 \end{bmatrix} \quad \text{Equation B1}$$

$$\hat{y}_i = a_0 + a_1 \hat{t}_i + a_2 \hat{t}_i^2 \quad \text{Equation B2}$$

equation (2) $\hat{y}_i$ is an estimate of measurements Y at $\hat{t}_i = \hat{t}_{N+1}$ sampling time. Or, in short matrix notation, Equation B2 can be written as:

$$\Gamma = HA$$

$$\text{Where } \Gamma = \begin{bmatrix} \sum y_i \\ \sum t_i y_i \\ \sum t_i^2 y_i \end{bmatrix}, H = \begin{bmatrix} N & \sum t_i & \sum t_i^2 \\ \sum t_i & \sum t_i^2 & \sum t_i^3 \\ \sum t_i^2 & \sum t_i^3 & \sum t_i^4 \end{bmatrix}, \text{ and}$$

$$A = \begin{bmatrix} a_0 \\ a_1 \\ a_2 \end{bmatrix}$$

Solving the above linear equations for coefficient matrix A, as shown by Equation B3 below, $$A = H^{-\Gamma} \quad \text{Equation B3.}$$

the next point Y can be estimated, if next time sampling interval $\Delta \hat{t}$ is known. It can be estimated as an average of values of actual sampling intervals of the vector T. Equation B4, as shown below, is an estimate of future sampling interval.

$$\Delta \hat{t} = \frac{\sum_{0}^{N} \Delta t_i}{N} \qquad \text{Equation B4}$$

Equation B5 is an estimate of the next sampling time that can be used in Equation B2 to obtain an estimate of the next measurement $\hat{y}=y_{N+1}$ $$\hat{t}_{N+1} = t_N + \Delta \hat{t} \qquad \text{Equation B5}$$

The Least Squares Method of Filtering Algorithm

Step 1. Initialize data vectors for center, left and right points $$S_{(C)i} = \begin{bmatrix} x_i^C \\ y_i^C \end{bmatrix}_{i=0}^{N}, S_{(L)i} = \begin{bmatrix} x_i^L \\ y_i^L \end{bmatrix}_{i=0}^{N}, S_{(R)i} = \begin{bmatrix} x_i^R \\ y_i^R \end{bmatrix}_{i=0}^{N},$$

and also time sampling $$T_i = \begin{bmatrix} t_0 \\ t_1 \\ \vdots \\ t_N \end{bmatrix}$$

vector with N samples. N could be chosen arbitrarily or by empirical observations best suited for a particular application.

Step 2. Predict samples $\hat{S}_{(C)N+1}$, $\hat{S}_{(L)N+1}$ and $\hat{S}_{(R)N+1}$ at $t=t_{N+1}$ as following steps show:

2.1 Compute $\Delta \hat{t}$—estimate of time interval for the next sample as $$\Delta \hat{t} = \frac{\sum_{0}^{N} \Delta t_i}{N} = \frac{t_N - t_0}{N-1}$$

2.2 Compute next sampling time estimate $\hat{t}_{N+1} = t_N + \Delta \hat{t}$ 2.3 Compute coefficients in matrices $A^{x,y}_{(C)}, A^{x,y}_{(L)}, A^{x,y}_{(R)}$ as $A = H^{-1}\Gamma$ where observation matrices $H_{(C,L,R)}$ and vectors $\Gamma_{(C,L,R)}$ are obtained as shown in the above overview for center, left and right sample vectors using data for x and y coordinates from time 0 to N.

2.4 Compute sample estimates at $t_{N+1}$ for center, left and right points as:

$$\hat{S}_{(C)N+1} = \begin{bmatrix} \hat{x} \\ \hat{y} \end{bmatrix}_{(C)N+1} = \begin{bmatrix} a_0^x & a_1^x & a_2^x \\ a_0^y & a_1^y & a_2^y \end{bmatrix}_{(C)} \begin{bmatrix} \hat{t}_{N+1}^0 \\ \hat{t}_{N+1}^1 \\ \hat{t}_{N+1}^2 \end{bmatrix},$$

$$\hat{S}_{(L)N+1} = \begin{bmatrix} \hat{x} \\ \hat{y} \end{bmatrix}_{(L)N+1} = \begin{bmatrix} a_0^x & a_1^x & a_2^x \\ a_0^y & a_1^y & a_2^y \end{bmatrix}_{(L)} \begin{bmatrix} \hat{t}_{N+1}^0 \\ \hat{t}_{N+1}^1 \\ \hat{t}_{N+1}^2 \end{bmatrix},$$

$$\hat{S}_{(R)N+1} = \begin{bmatrix} \hat{x} \\ \hat{y} \end{bmatrix}_{(R)N+1} = \begin{bmatrix} a_0^x & a_1^x & a_2^x \\ a_0^y & a_1^y & a_2^y \end{bmatrix}_{(R)} \begin{bmatrix} \hat{t}_{N+1}^0 \\ \hat{t}_{N+1}^1 \\ \hat{t}_{N+1}^2 \end{bmatrix}$$

Step 3. Obtain actual sample and actual sampling time at N+1 instance of sampling process $$S_{(C)N+1} = \begin{bmatrix} x \\ y \end{bmatrix}_{(C)N+1}, S_{(L)N+1} = \begin{bmatrix} x \\ y \end{bmatrix}_{(L)N+1}, S_{(R)N+1} = \begin{bmatrix} x \\ y \end{bmatrix}_{(R)N+1}$$

Step 4. Compute errors between previously estimated samples and those obtained from actual data stream as:

$$E_{(C)N+1} = |S_{(C)N+1}| - |\hat{S}_{(C)N+1}|$$

$$E_{(L)N+1} = |S_{(L)N+1}| - |\hat{S}_{(L)N+1}|$$

$$E_{(R)N+1} = |S_{(R)N+1}| - |\hat{S}_{(R)N+1}|$$

Step 5. Compare the errors with a thresholds separately selected for x and y dimensions for all three points C, L, and R Step 6. If actual data points are within the allowed bandwidth then use actual data points to update the sample arrays otherwise use the estimated value to get rid of the outliers from the data stream. Adding the selected value to the end of the sample data and deleting the oldest value at the beginning of the vector will update the data for the next round of data acquisition.

Go to Step 2

The Least Squares Method Numerical Example of Estimate of Missing Points

Consider a one-dimensional case, say dimension x, and one tracked point in the imagery stream. Let N=6 and $$T = \begin{bmatrix} 0.00 \\ 0.15 \\ 0.28 \\ 0.41 \\ 0.56 \\ 0.70 \end{bmatrix}, \text{ and } S^6 = \begin{bmatrix} 1.7 \\ 1.9 \\ 1.8 \\ 1.6 \\ 1.4 \\ 1.5 \end{bmatrix}$$

Estimate next sampling time:

$$\hat{t}_7 = 0.7 + \frac{0.7 - 0.0}{5} = 0.70 + 0.14 = 0.84$$

Compute entries of H,
N=6
$\Sigma t_i = 0.00 + 0.15 + 0.28 + 0.41 + 0.56 + 0.70 = 2.10$;
$\Sigma t_i^2 = 0.00^2 + 0.15^2 + 0.28^2 + 0.41^2 + 0.56^2 + 0.70^2 \cong 1.07$;
$\Sigma t_i^3 = 0.00^3 + 0.15^3 + 0.28^3 + 0.41^3 0.56^3 + 0.70^3 \cong 0.61$;
$\Sigma t_i^4 = 0.00^4 + 0.15^4 + 0.28^4 + 0.41^4 + 0.56^4 + 0.70^4 \cong 0.37$;

And $\Gamma$
$\Sigma y_i = 1.7 + 1.9 + 1.8 + 1.6 + 1.4 + 1.5 = 9.90$;
$\Sigma t_i y_i = 0.00 \times 1.7 + 0.15 \times 1.9 + 0.28 \times 1.80 + 0.41 \times 1.60 + 0.56 \times 1.4 + 0.70 \times 1.50 \cong 3.28$;

$\Sigma t_i^2 y_i = 0.00^2 \times 1.70 + 0.15^2 \times 1.90 + 0.28^2 \times 1.80 + 0.41^2 \times 1.60 + 0.56^2 \times 1.40 + 0.70^2 \times 1.50 \cong 1.63;$ Or in matrix notation:

$$\begin{bmatrix} 9.90 \\ 3.28 \\ 1.63 \end{bmatrix} = \begin{bmatrix} 6.00 & 2.10 & 1.07 \\ 2.10 & 1.07 & 0.61 \\ 1.07 & 0.61 & 0.37 \end{bmatrix} \begin{bmatrix} a_0 \\ a_1 \\ a_2 \end{bmatrix}$$

Inverting the H and solving for A we have:

$$\begin{bmatrix} a_0 \\ a_1 \\ a_2 \end{bmatrix} = \begin{bmatrix} 1.8512 \\ -0.6348 \\ 0.1175 \end{bmatrix} = \begin{bmatrix} 0.4335 & -0.0182 & -1.4603 \\ -0.0182 & -7.6725 & 15.1605 \\ -1.4603 & 15.1605 & -21.5658 \end{bmatrix} \begin{bmatrix} 9.90 \\ 3.28 \\ 1.63 \end{bmatrix}$$

Estimate of S at time N+1 is $$\hat{y}_7 = \begin{bmatrix} 1 & 0.84 & 0.84^2 \end{bmatrix} \begin{bmatrix} 1.8512 \\ -0.6348 \\ 0.1175 \end{bmatrix} \cong 1.40$$

Motion Decisions

All motion decision methods of the gesture recognition system of the present invention are based on pixel-to-waveform transformation. The X-Y coordinates shown in FIG. 12 for the three points of reference are arranged in data arrays representing their location history with reference to sampling time during the gesturing. These arrays are normalized to the center point (coordinate system translation), and then analyzed for the most important features: amplitude, frequency and phase and their relative locations.

Figure 12:
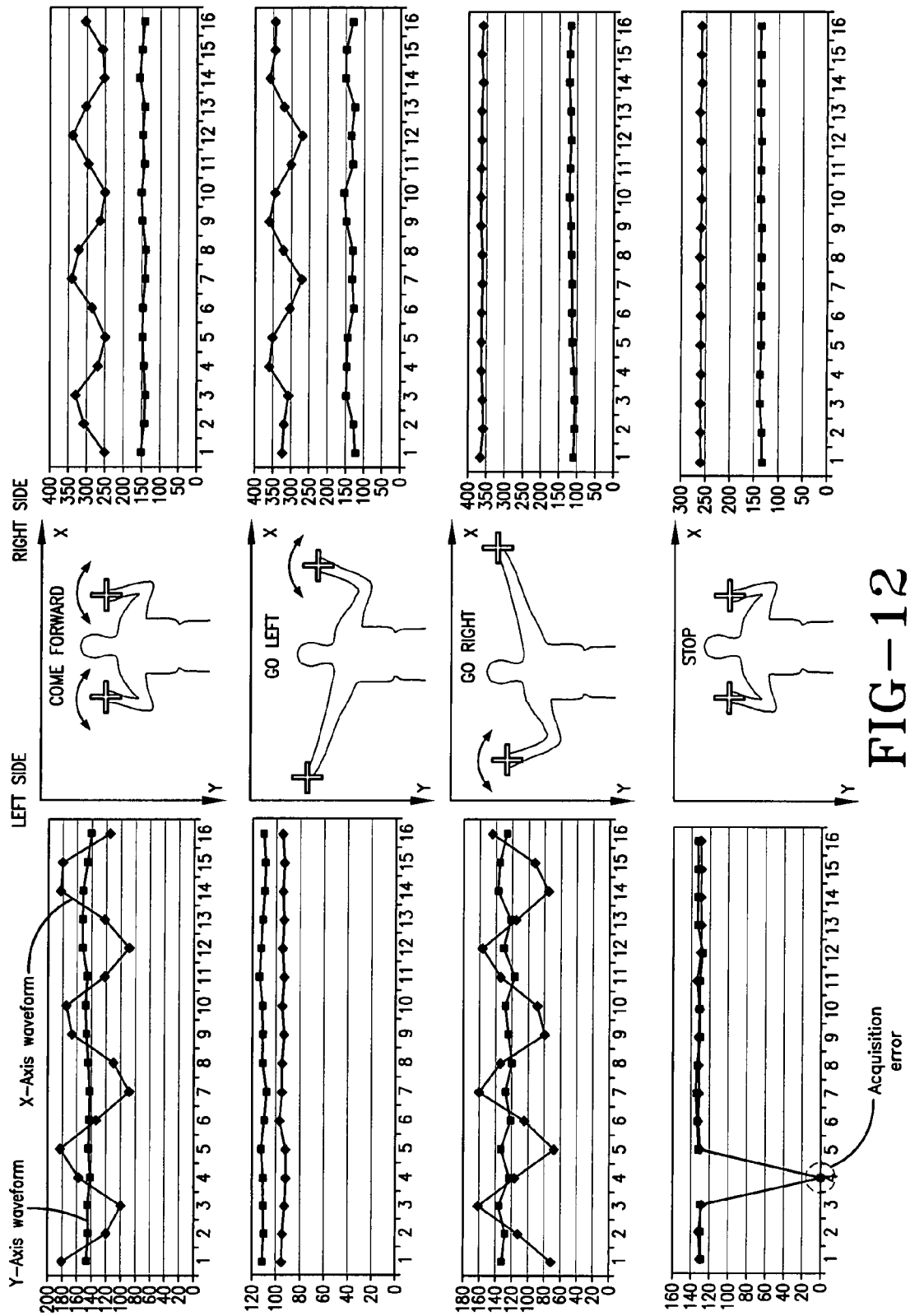
FIG. 12 illustrates a set of data arrays and four images, in which three points were tracked—head (center), left hand, and right hand points, the pixel space (four images) preprocessed to highlight the important three points, and the three points converted to X and Y waveform representation.

Several decision-making algorithms were developed by the present inventors to interpret the gestures. For initial experiments, only three points were tracked—head (center), left hand, and right hand points. The pixel space was preprocessed to highlight the important three points (as illustrated in FIG. 6 and FIG. 7), and converted to waveform representation. The tracked data was then arranged in data arrays, representing X and Y waveforms, as illustrated in FIG. 12.

The theory for the presently claimed system of gesture interpretation is that if someone can visually distinguish a signal from other signal(s) in spatial (pixel) domain, then this difference should be encapsulated in the constituent waveforms that represent these visual differences. As shown in FIG. 12, higher amplitudes on the X-axis, and lower amplitudes on the Y-axis, for both left and right hands, characterizes forward motion. Another important characteristic of forward signal is 180 degrees phase of left and right waveforms.

Rule-Based Approach to Motion Decisions With Thresholds

The first motion decision technique used in the present invention is based on a threshold approach and executed as shown in FIG. 2 in the Make Command Decision block, wherein all of the acquired waveform features are passed through a set of thresholds as antecedents to the decision-making rules. In essence, this is an expert system that considers the features in combinations, and forces one of the decision rules to fire (i.e., to be implemented). The most important features are amplitude, frequency and phase of the waveforms. Also, an average X-Y location of the important points (i.e. hands) of the gesturing director is used to determine other aspects of the signals such as hands height positions, hands horizontal extensions, hands overlap.

When all of the features are extracted from the waveforms, a decision can be made by the system and computer program herein. The extracted features, in addition to the current locations and an average of the most recent 3 points, are compared to a set of rules describing the possible commands. The data is then compared to each possible command, which in turn returns a true (data matches this command) or false (data doesn't match this command). If only one command is true, then that becomes the decision. If more then one is true, then it is reported as an error, and the "stop" command is enforced.

To prevent poor command decisions, each command decision is placed into a buffer. The command output by the computer is the fourth command in the buffer. If a decision in the first and fourth slots in the buffer match each other, but don't match the second or third decisions, both the second decision and the third decision are forced to correspond to the first decision. This way, transitions (e.g., fwd to left movement of the vehicle) are captured, but system jitters are rejected.

Rules of Motion for the Threshold-Based approach to Motion Decisions

Specifically, five commands (forward, back, left, right, and stop) can be implemented using the rule-based approach with thresholds. All threshold units are in pixels or Hz, and their values can be found in the rules below. Top-level logic to run this High Level Control is: if two or more commands are true, or if no commands are true, an error is returned. Otherwise the resultant command is sent. Details of each of the five commands are as follows:

Stop Rule

All gestures (except for stop) are turned off, and stop is turned on, if one of the following conditions applies:

1. Amplitude of any hand axis drops below 1 pixel, or all hand axis amplitudes are below 10 pixels. This is to force a stop condition when there is no relevant movement. Usually, when amplitudes drop to these levels, it is because the search algorithms are returning a motionless object.

2. Frequency of all hand axes are above 3 Hz. When the primary frequency is above 3 Hz, it means that the object that is found is not moving, and that the search algorithms are returning varying points on the same object.

In addition to the previous two conditions, stop is also found to be true if left y and right y positions are greater then 70 (above the neck), and absolute difference between the x positions of the two hands of the director is less then 50 (i.e., when the hands are both about the same distance from the head).

Forward Rule

A forward command is true when both the left and right hand Y positions are between 70 and 150 (across the chest), the difference between left hand X and right hand X is less then 25 (i.e., when they are both about the same distance from the centerline of the body), and left X and right X amplitude is greater then 10.

Back Rule

A back command is given whenever left and right hand Y positions are greater then 150 (i.e., the hands of the director are positioned about the level of the waist line and below), and as stated before, there is enough movement to prevent a fall into stop condition.

Left and Right Rules

A left command occurs when the difference between the left hand and right hand X positions is greater then 50 (i.e., the right hand is positioned close to the centerline, and the left hand is positioned far from the centerline), or just the right hand X amplitude is greater then 20 while the left hand X amplitude is less then 10 (i.e., the right hand is waving, while the left hand is pointing). Finally, the right command is the exact opposite of the left command.

Subsumption Approach to Motion Decisions

The second method used in the present invention is based on subsumption architecture, using rules, as well as Fuzzy Adaptive Resonance Theory (Fuzzy ART) Neural Network, to interpret the waveforms. In this approach, all pertinent motions are divided into two types of behaviors—reflexive and cognitive. Reflexive behavior is one that has a higher degree of urgency or higher priority of actions. This behavior is similar to a reaction of someone touching a hot surface—the reflex is to stop the sensation immediately. These behaviors subsume all others, and do not require a transient time for stabilization of data when a gesture signal is changed.

Figure 13:
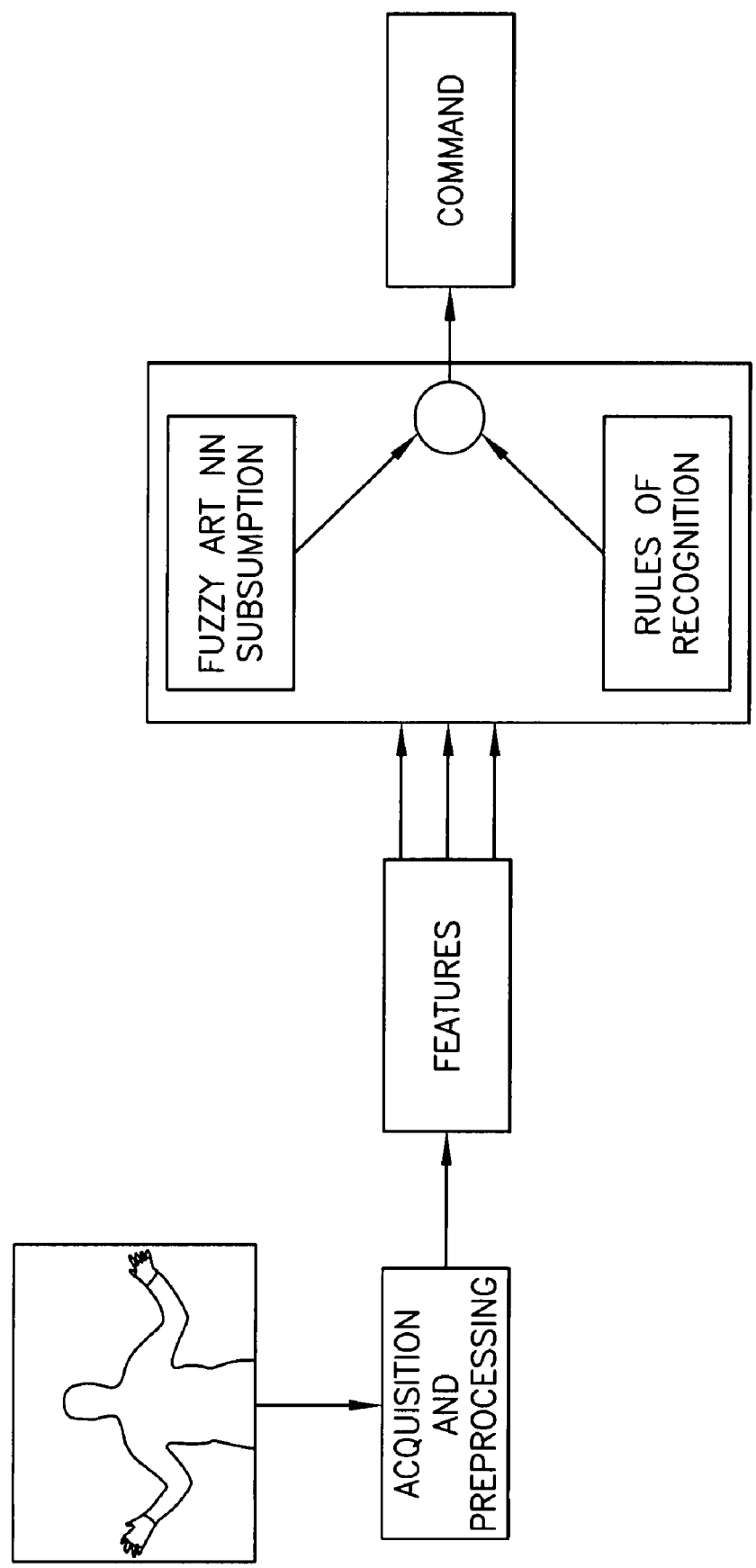
FIG. 13 is a flow diagram illustrating the subsumption decision-making process carried out by the gesture recognition system and computer program of the present invention.

For this purpose, the system and computer program of the present invention does not use data averaged over time. It simply checks the most recent hands location by constantly propagating the data through the neural network that imposed the reflexive action on the rest of the decision-making system when data indicated such a command. The subsumption trigger occurs when hands enter certain regions defined by the Fuzzy ART weights, and the current waveforms do not indicate dynamic motion (i.e., the command is static posture). The subsumption decision-making process is illustrated in FIG. 13.

The stop, enable, and disable signals are defined as reflexive motions, while move forward, left, right, and back, are interpreted as the cognitive group. The major difference between the reflexive and cognitive groups is that, for the reflexive motions, the system does not wait until the transient period has ended. These commands are applied immediately, even if the system is in the middle of other types of motion.

An example of subsumption behavior is a situation in which a vehicle is in motion forward, while the director is changing the signal from forward to left. The system collects data, even during transition, of signaling from forward to left command. Since this data is inconclusive, the vehicle will still perform forward motion, but will slow down and not come to an abrupt stop. As data becomes clear, the vehicle transitions to left motion.

However, if the hand(s) enter a specific region around the head (even by accident), the system checks the current waveform for dynamic gesturing or static pose, and might trigger stop or disable commands interrupting current vehicle motion. Hence, stop or disable behavior subsumes all others. The major shortcoming of such an implementation is occasional choppy behavior, manifesting itself in rear unexpected stops. However, the benefit of this implementation is far greater—safety of operation in a confined environment. It should be noted that an unwanted disable command never occurs due to the complex nature of pose—one hand is hidden behind the directors' back, while the other hand is raised just above the head. This pose is difficult to reproduce accidentally, since both hands are used during all other operations.

Rules of Motion for the Subsumptive Approach to Motion Decisions

Figure 14:
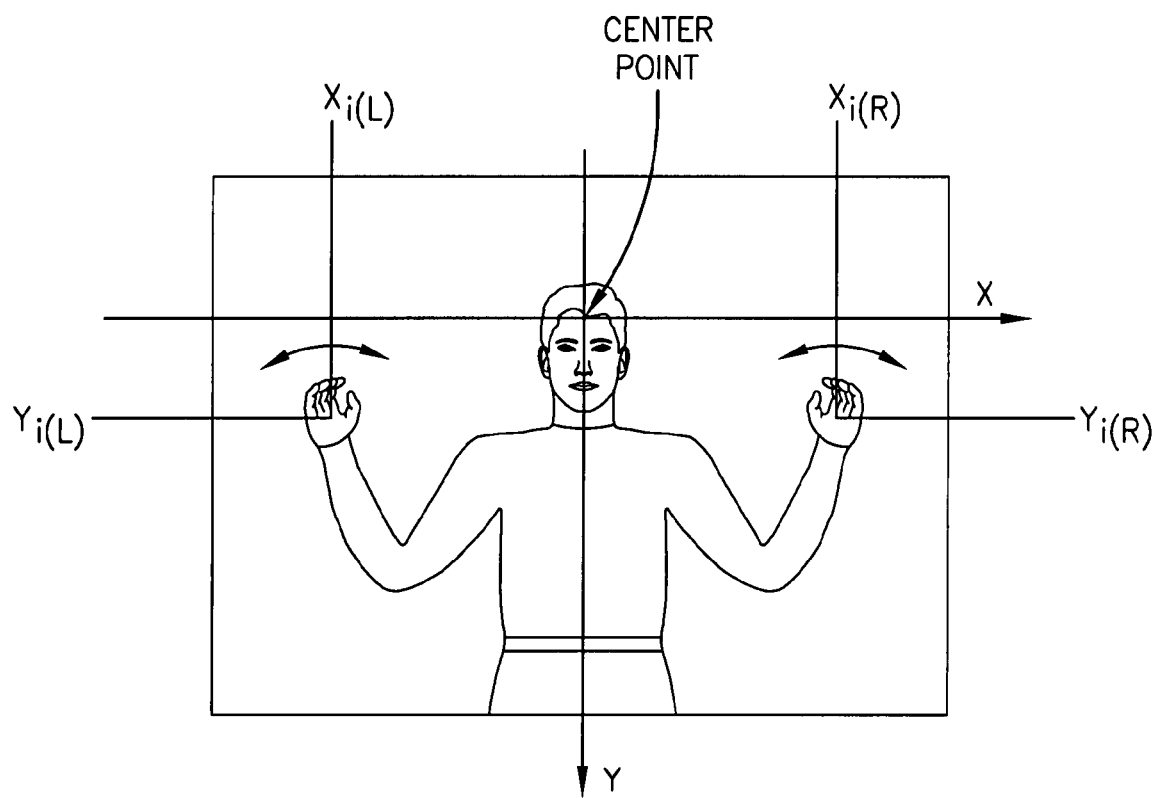
FIG. 14 is an image acquired by the gesture recognition system of the present invention, illustrating the basic variables for the three important points (left or right hands and center point) acquired by the system of the present invention when recognizing a user's gestures.

The rules of motion to recognize the commands depend on characteristics of the waveforms for the signals. It is desirable to reduce characteristics of the waveforms to some kind of class indicators, preferably to some unit-less numbers to make the system more robust or tolerable to scaling effect due to the different distances of the controlling director from the camera. The same applies to the rotation problem due to change of the director's orientation with respect to the camera. Specific decision rules for certain movement correspond to certain variables, as shown in FIG. 14, and as described in Table 1: Motion Variables for Class Indicators below.

Further, FIG. 14, in particular, defines basic variables for the three important points—left or right hands, and center point. These points are found on each frame (their X and Y coordinates—$X_{i(L)}, X_{i(R)}, y_{i(L)}, y_{i(R)}$) as the video stream is coming from the camera.

TABLE 1

Motion Variables for Class Indicators

| Variable(s) | Description |
| --- | --- |
| $\{S_{t_0}^{t_N}\}_{(R,L)} = \begin{cases} \{S_{t_0}^{t_N}\}_R = \{s_{t_0}, s_{t_1}, \ldots, s_{t_N}\}_R \\ \{S_{t_0}^{t_N}\}_L = \{s_{t_0}, s_{t_1}, \ldots, s_{t_N}\}_L \end{cases}$ | Data sample set for right and left points existing on some time interval $t_0 \leq t_i \leq t_N$ for X-Y coordinates. Note that both left and right points were normalized to the center and contain no errors. |
| $s_{i(R,L)} = \begin{bmatrix} x \\ y \end{bmatrix}_{i(R,L)}$ | One sample from the data set at time "i" for right or/and left points for X-Y coordinates. Note that $s_i$ is just one entry in any of the above sets. |
| $x_{i(R)}, x_{i(L)}$ | X - coordinates for right or/and left points at time "i". |
| $y_{i(R)}, y_{i(L)}$ | Y - coordinates for right and left points at time "i". |

TABLE 1-continued

Motion Variables for Class Indicators

| Variable(s) | Description |
| --- | --- |
| $\text{Avrg}(X_{(L,R)}) = \dfrac{\sum_{0}^{N-1} x_{i(L,R)}}{N}$ | Average locations of left and/or right hands along X or/and Y-axis for the most recent data history. |
| $\text{Avrg}(Y_{(L,R)}) = \dfrac{\sum_{0}^{N-1} y_{i(L,R)}}{N}$ | |
| $\delta = \dfrac{\text{Avrg}(X_L)}{\text{Avrg}(X_R)}$ <br> For $\text{Avrg}(X_R) \neq 0$ | Distance variable |
| $\delta = \begin{cases} \approx 1 \\ \geq 1 + \alpha \\ \leq 1 - \alpha \end{cases}$ <br> Where $0 < \alpha < 1$ | Distances for left and right hands along X-axis are equal, <br> Left distance is greater <br> Right distance is greater |
| $\text{Avrg}(Y_L) \approx 0$ | Left hand at head (center point) level |
| $\text{Avrg}(Y_L) > 0$ | Left hand above head |
| $\text{Avrg}(Y_L) < 0$ | Left hand below head |
| $\text{Avrg}(Y_R) \approx 0$ | Right hand at head level |
| $\text{Avrg}(Y_R) > 0$ | Right hand above head |
| $\text{Avrg}(Y_R) < 0$ | Right hand below head |
| $P_X$ | Number of pixels along X axis |
| $P_Y$ | Number of pixels along Y axis |
| $A(X_{(L,R)}) = \text{Ampl}(X_{(L,R)})$ <br> $A(Y_{(L,R)}) = \dfrac{P_X}{P_Y} \text{Ampl}(Y_{(L,R)})$ | Amplitude along X axis for left or/and right hands <br> Amplitude along Y axis (normalized to X axis) for left or/and right hands |
| $\theta_L = x_{N(L)} - x_{N-1(L)}$ | Directional vector variable for left side along X axis |
| $\theta_R = x_{N(R)} - x_{N-1(R)}$ | Directional vector variable for right side along X axis |
| $\vartheta_L = y_{N(L)} - y_{N-1(L)}$ | Directional vector variable for left side along Y axis |
| $\vartheta_R = y_{N(R)} - y_{N-1(R)}$ | Directional vector variable for right side along Y axis |
| $\theta_L \approx 0, \theta_R \approx 0$ | No motion along X axis |
| $\theta_L > 0, \theta_R > 0$ | Left or/and right hands motion in +X direction |
| $\theta_L < 0, \theta_R < 0$ | Left or/and right hands motion in −X direction |
| $\vartheta_L \approx 0, \vartheta_L \approx 0$ | No motion along Y axis |
| $\vartheta_L > 0, \vartheta_R > 0$ | Left or/and right hands motion in +Y direction |
| $\vartheta_L < 0, \vartheta_R < 0$ | Left or/and right hands motion in −Y direction |

The above variables are used to compute class-indicators for forward, left, right, stop, and back motions. In addition to the above, stop, enable, and disable commands are implemented in Fuzzy ART weights. Note that the stop command is duplicated in both systems of decision to provide redundancy for this important command.

Forward Rule

Amplitudes in the X direction greater than in the Y direction, with both hands positioned approximately symmetrically with respect to the head while both hands are waved in out-of-phase fashion, characterize a forward command.

$$\text{IF} \begin{bmatrix} \{A(X_L) \neq 0 \land A(X_R) \neq 0 \land A(Y_L) \neq 0 \land A(Y_R) \neq 0\} \land \\ \{\langle A(X_L) > A(Y_L)\rangle \land \langle A(X_R) > A(Y_R)\rangle\} \land \\ \{\delta \approx 1\} \land \\ \{\langle \theta_L > 0 \land \theta_R < 0 \rangle \lor \langle \theta_L < 0 \land \theta_R > 0\rangle\} \end{bmatrix} \Rightarrow \text{True(Forward)}$$

$$\text{ELSE} \Rightarrow \text{False(Forward)}$$

Back Rule

Both hands dropped below the waist without any motion characterize the "go back" command. It should be noted that the go back command (FIG. 3k) was not implemented exactly as the NATOPS standard signal vocabulary suggested. This command can be implemented by stipulating large amplitudes in Y direction and small amplitudes in X direction, while both hands are below the center point with palms facing forward.

$$IF \begin{bmatrix} \{\theta_L \approx 0 \land \theta_R \approx 0 \land \partial_L \approx 0 \land \partial_R \approx 0\} \land \\ \{Avrg(Y_L) < 0 \land Avrg(Y_R) < 0\} \end{bmatrix} \Rightarrow \text{True(Back)}$$

ELSE ⇒ False(Back)

Left Rule

The left side hand (from the robots' point-of-view) extended outwards and kept still, while the right side hand is raised to the head level and repeatedly pivoting with respect-to-the elbow, characterizes the "go left" command.

$$IF \begin{bmatrix} \{A(X_R) > A(X_L)\} \land \\ \{\delta > 1 + \alpha\} \end{bmatrix} \Rightarrow \text{True(Left)}$$

ELSE ⇒ False(Left)

Right Rule

The right side hand (from the robots' point-of-view) extended outwards and kept still, while the left side hand is raised to head level and repeatedly pivoting with respect-to-the elbow, characterizes the "go right" command.

$$IF \begin{bmatrix} \{A(X_R) < A(X_L)\} \\ \{\delta < 1 - \alpha\} \end{bmatrix} \Rightarrow \text{True(Right)}$$

ELSE ⇒ False(Right)

Stop Rule

Both hands raised above the head, without any motion and with fists closed, defines a "stop" command. For implementation of the NATOPS-like style stop signal, it is necessary to recognize clinched fist and open palm gesturing. In an alternative embodiment of the present invention, implementation of color video acquisition is provided. This color video acquisition, in conjunction with appropriate marking on gloves, allows the system of the present invention to distinguish a user's closed fist and open palm gestures, and transform them to information in data stream.

$$IF \begin{bmatrix} \{\theta_L \approx 0 \land \theta_R \approx 0 \land \partial_L \approx 0 \land \partial_R \approx 0\} \land \\ Avrg(Y_L) > 0 \land Avrg(Y_R) > 0 \end{bmatrix} \Rightarrow \text{True(Stop)}$$

ELSE ⇒ False(Stop)

Subsumption Approach to Motion Decisions

Fuzzy Adaptive Resonance Theory (ART) Gesture Recognition Subsystem

The basic principle behind fuzzy logic is the argument that a set A can intersect with its compliment $A^c$ ($A \cap A^c \neq 0$). The idea is that, instead of a unique existence for A and $A^c$, there exists a fuzziness at the boundaries between the two sets. The degree of fuzziness is a measure of this uncertainty. So, it can be extended that if more than one set exist within this universe, the measure of uncertainty is not a crisp result, but a measure of degree (fuzziness) that one set belongs to another within this region of uncertainty. Using this relationship, each set can be viewed as a fuzzy set. In these fuzzy sets, the elements contain a measure of "membership" between all sets within their universe.

In the present invention, three commands, i.e., stop, enable, and disable, are provided in a "fuzzy ART recognition subsystem" of the present invention. All commands involve a user's static posturing, containing no dynamic information, and therefore involve using only location variables. As soon as the user's hands enter a specific area, determined by the weights shown below in Table 2, the waveforms are checked for dynamic characteristics such as amplitude and directional vectors. If the dynamic characteristics are not present, then a subsumption trigger will occur. The fuzzy ART neural network will fire an appropriate node after propagating the current hand locations through the weights as described below.

TABLE 2

Fuzzy Art weights for enable, disable and stop commands

| | $x_{N(L)}$ | $x_{N(R)}$ | $y_{N(L)}$ | $y_{N(R)}$ |
|---|---|---|---|---|
| Enable | 0.50 | −20.00 | 4.00 | 35.00 |
| | 0.70 | −30.00 | 3.50 | 38.00 |
| | 1.50 | −50.00 | 3.00 | 37.00 |
| | 2.50 | −24.00 | 2.90 | 34.70 |
| | 2.90 | −30.00 | 4.10 | 35.20 |
| | 1.70 | −60.00 | 3.10 | 36.00 |
| Disable | 40.00 | 1.50 | 40.00 | 4.00 |
| | 20.00 | 0.90 | 41.00 | 4.30 |
| | 55.00 | 1.00 | 37.00 | 3.80 |
| | 60.00 | 1.70 | 42.00 | 4.20 |
| | 30.00 | 1.60 | 40.00 | 3.90 |
| | 25.00 | 1.00 | 39.00 | 3.90 |
| Sto | 30.00 | −30.00 | 40.00 | 35.00 |
| | 25.00 | −35.00 | 34.00 | 33.00 |
| | 35.00 | −35.00 | 37.00 | 34.00 |

In particular, the system of the present invention can determine the relationship of memorized patterns to the current pattern (movements of the user) presented for recognition. The weighted vectors stored in memory represent the patterns to be recognized. The intersection of the weighted patterns forms a region of uncertainty that presents difficulty for the standard classifiers to deal with. The region of uncertainty for Fuzzy ART can actually work to its advantage.

First, the input to the input layer ($F_0$) of Fuzzy ART normalizes the real number values within the range of [0,1] by the equation $a_i = IN_i/\|IN\|$, where IN is the input vector supplied to the input layer and $\|IN\| = \Sigma(INi)$. Normalization is performed to establish membership functions. The compliment of $a_i$ is $a_i^c = 1 - a_i$, thus the input to the vigilance layer F1 becomes $I = (a_i, a_i^c)$. Notice the input set includes both the actual input and its compliment. Therefore, for each entry, there exists a unique compliment with the exception when $a_i = 0.5(a_i^c = 1 - a_i = 0.5)$.

Network weights initially are set to 1, where $w_{j1}(0) = \cdots 1 \ldots w_{j2m}(0) = \cdots 1$; AND where m is the number of inputs (note that there are 2 m weight for each row including the compliment). The output nodes of layer $F_2$ are uncommitted. Weights are determined by the test for vigilance $$\frac{|I \land w_{ji}|}{|I|} \geq \rho,$$

where ρ is the vigilance parameter. However, in this case ρ takes on a very special role that keeps the algorithm true to the fuzzy domain. Notice, in the above relationship, if $$\frac{|I \wedge w_{Ji}|}{|I|} < \rho,$$

it is said that a mismatch occurs and the output for this node is set to zero, so it is not chosen again. It forces the nodes above the selected category for the I being evaluated to be smaller than the node being updated. So, the weights are updated (resonance) if the vigilance criteria is met $$\frac{|I \wedge w_{Ji}|}{|I|} \geq \rho.$$

Figure 15:
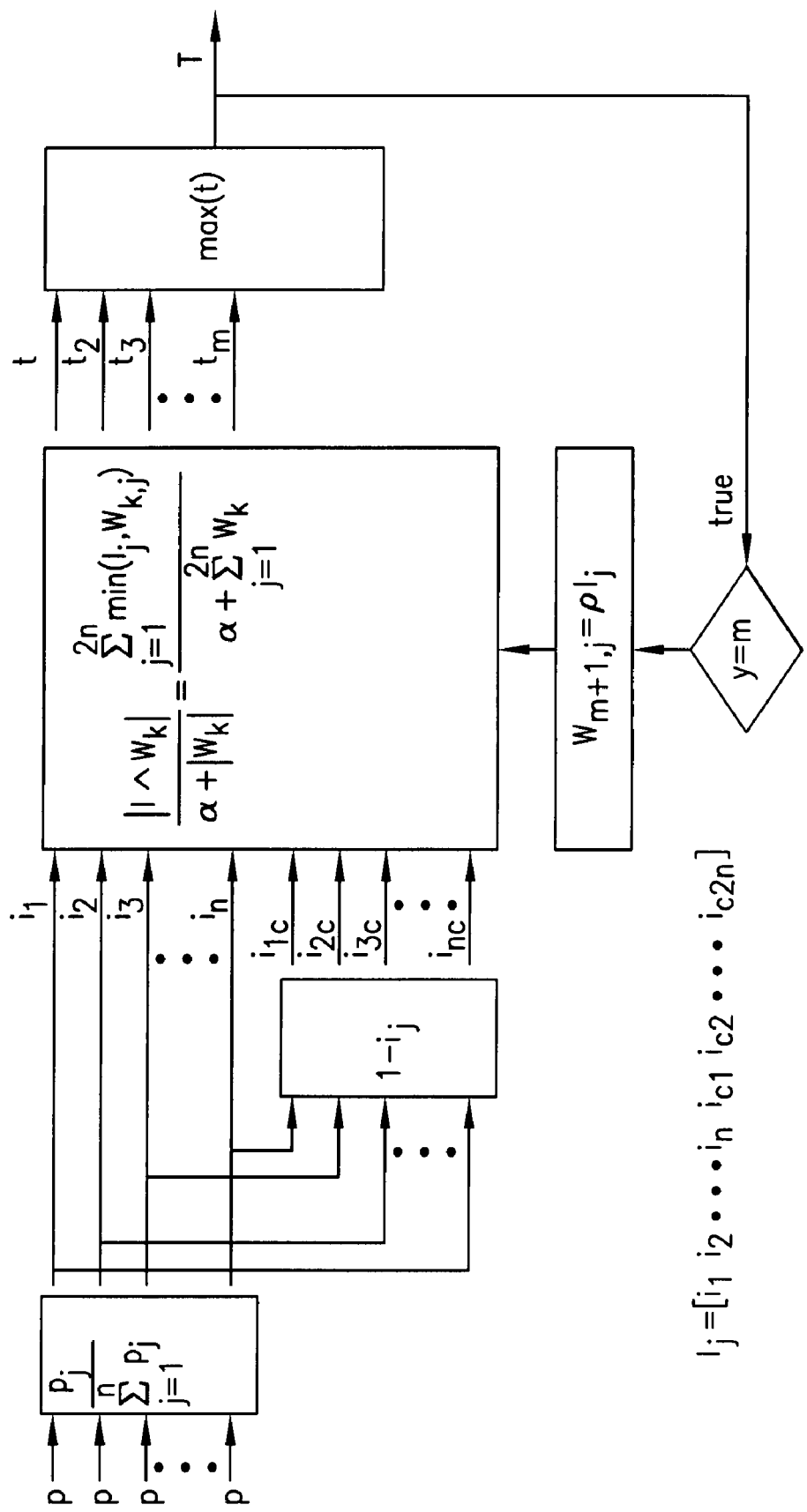
FIG. 15 is a flow diagram illustrating the steps taken by the Fuzzy Adaptive Resonance Theory (ART) Gesture Recognition Subsystem of the present invention.

This is also $|I \hat{} w_{Ji}| \geq \rho |I|$. The weights are updated by: $w_J^{(new)} = \beta(I \hat{} w_J^{(old)}) + (1-\beta)w_J^{(old)}$ β sets the speed of re-coding. Observe, however the weights must converge to $|I \hat{} w_{Ji}| \geq \rho |I|$ to meet the stopping condition.
$w_J^{(new)} \beta(I \hat{} w_J^{(old)}) + (1-\beta)w_J^{(old)} = \beta(\rho|I|) + (1-\beta)w_J^{(old)}$,
and if β is set to 1, fast learning occurs, giving the update values by $w_J^{(new)} = (\rho|I|)$. As ρ is increased, the degree of fuzziness is decreased, and as p is decreased the opposite is true. Thus, defining the width of the membership between each training set.

$$T_j(I) = \frac{|I \wedge w_J|}{\alpha + |w_J|},$$

where $|I \hat{} w_J|$ is the fuzzy "and" defining the intersection of the two fuzzy sets. min(I,w). (α=0.00 for the study presented in this paper). The output winning node is $Y_J = \max(T_j)$. The above steps taken by Fuzzy Adaptive Resonance Theory (ART) Gesture Recognition Subsystem are illustrated in FIG. 15.

Numerical Example for Classification by Fuzzy ART $$M = \begin{bmatrix} 55 & 1 & 37 & 3.8 \\ 60 & 1.7 & 42 & 4.2 \\ 30 & 1.6 & 40 & 3.9 \\ 25 & 1 & 39 & 3.9 \\ 30 & -30 & 40 & 35 \\ 25 & -35 & 34 & 33 \end{bmatrix}$$

Given a weight matrix

And a pattern for classification by Fuzzy ART neural network $P = [26\ -26\ 35\ 34]$ Find class of P in M Step 1 Multiplying M by generalization factor α=0.7 we have $$M' = \begin{bmatrix} 38.5 & 0.7 & 25.9 & 2.66 \\ 42 & 1.19 & 29.4 & 2.94 \\ 21 & 1.12 & 28 & 2.73 \\ 17.5 & 0.7 & 27.3 & 2.73 \\ 21 & -21 & 28 & 24.5 \\ 17.5 & -24.5 & 23.8 & 23.1 \\ 24.5 & -24.5 & 25.9 & 23.8 \end{bmatrix}$$

Step 2: Normalize the weights and pattern to first norm using $$|M| = \frac{m_{j,i}}{\sum_{j=1,i=1}^{j=R,i=C} \text{abs}(m_{j,i})}$$

As an example for j=2 (second row) and i=3 (third column) element we have $$|m_{2,3}| = \frac{29.4}{42 + 1.19 + 29.4 + 2.94} = 0.38925$$

the entire matrix and the pattern after normalization are $$|M| = \begin{bmatrix} 0.56818 & 0.010331 & 0.38223 & 0.039256 \\ 0.55607 & 0.015755 & 0.38925 & 0.038925 \\ 0.39735 & 0.021192 & 0.5298 & 0.051656 \\ 0.36284 & 0.014514 & 0.56604 & 0.056604 \\ 0.22222 & -0.22222 & 0.2963 & 0.25926 \\ 0.19685 & -0.27559 & 0.26772 & 0.25984 \\ 0.24823 & -0.24823 & 0.26241 & 0.24113 \end{bmatrix}$$

$|P| = [0.21488\ -0.21488\ 0.28926\ 0.28099]$

Step 3: Take complement of M and P using $|A'| = 1 - |A|$

For instance for the first element in second row of M $1 - 0.55607 = 0.44393$

If an element in |M| is less then zero then $|m'| = -1 + |m|$. For example consider element $[5,2] \Rightarrow |m'| = -1 + 0.22222 = -0.77778$ Or for the entire matrix this operation gives:

$$|M'| = \begin{bmatrix} 0.43182 & 0.98967 & 0.61777 & 0.96074 \\ 0.44393 & 0.98424 & 0.61075 & 0.96108 \\ 0.60265 & 0.97881 & 0.4702 & 0.94834 \\ 0.63716 & 0.98549 & 0.43396 & 0.9434 \\ 0.77778 & -0.77778 & 0.7037 & 0.74074 \\ 0.80315 & -0.72441 & 0.73228 & 0.74016 \\ 0.75177 & -0.75177 & 0.73759 & 0.75887 \end{bmatrix}$$

and $|P'| = [0.78512\ -0.78512\ 0.71074\ 0.71901]$

Step 4: Create new matrices by augmenting |M| by |M'| and |P| by |P'|

$$aug|M| = \begin{bmatrix} 0.56818 & 0.010331 & 0.38223 & 0.039256 \\ 0.55607 & 0.015755 & 0.38925 & 0.038925 \\ 0.39735 & 0.021192 & 0.5298 & 0.051656 \\ 0.36284 & 0.014514 & 0.56604 & 0.056604 \\ 0.22222 & -0.22222 & 0.2963 & 0.25926 \\ 0.19685 & -0.27559 & 0.26772 & 0.25984 \\ 0.24823 & -0.24823 & 0.26241 & 0.24113 \end{bmatrix}$$

-continued $$\begin{bmatrix} 0.43182 & 0.98967 & 0.61777 & 0.96074 \\ 0.44393 & 0.98424 & 0.61075 & 0.96108 \\ 0.60265 & 0.97881 & 0.4702 & 0.94834 \\ 0.63716 & 0.98549 & 0.43396 & 0.9434 \\ 0.77778 & -0.77778 & 0.7037 & 0.74074 \\ 0.80315 & -0.72441 & 0.73228 & 0.74016 \\ 0.75177 & -0.75177 & 0.73759 & 0.75887 \end{bmatrix}$$

Note that very small numbers become relatively large. This operation eliminates the scaling problem due to the presence of small and large numbers in data.

aug|P|=[0.21488 −0.21488 0.28926 0.28099
    0.78512 −0.78512 0.71074 0.7.1901]

Step 5: Obtain activity in output layer of the Neural Network using $$\frac{|P \wedge W_K|}{|\alpha + W_K|} = \frac{\sum_{j=1}^{2N} \min(P_j, W_{k,j})}{\alpha + \sum_{j=1}^{j=2N} W_{k,j}}$$

Where ^ is the minimum number between each entry in P and corresponding element in W. For example, consider second row of aug|M| and aug|P|

| | | | | | | | | |
|---|---|---|---|---|---|---|---|---|
| W | 0.55607 | 0.015755 | 0.38925 | 0.038925 | 0.44393 | 0.98424 | 0.61075 | 0.96108 |
| P | 0.21488 | −0.21488 | 0.28926 | 0.28099 | 0.78512 | −0.78512 | 0.71074 | 0.71901 |
| Minimum number | 0.21488 | −0.21488 | 0.28926 | 0.038925 | 0.44393 | −0.78512 | 0.61075 | 0.71901 |
| Sum of minimums. | 0.21488 + (−0.21488) + 0.28926 + . . . = 1.3168 | | | | | | | |
| W | 0.55607 | 0.015755 | 0.38925 | 0.038925 | 0.44393 | 0.98424 | 0.61075 | 0.96108 |
| Sum of weight in row | 4.0000 | | | | | | | |

Hence, the activity in the second output node for α=0.03 is $$A_{K=2} = \frac{1.3168}{0.03 + 4.0000} = 0.32674$$

Total activity for the network of eight nodes is

| 1 | 2 | 3 | 4 | 5 | 6 | 7 |
|---|---|---|---|---|---|---|
| 0.32555 | 0.32674 | 0.3344 | 0.3352 | 0.96381 | 0.9254 | 0.91951 |

Selecting the largest number gives us a winning node #5 with activity value=0.96381.

Result:

In conclusion, it is shown that the pattern

P=[26 −26 35 34]

most closely resembles weight row number 5 equal to $m_5$=[30 −30 40 35]

Application Software for Control of the Robotic Gesture Recognition System

Figure 16:
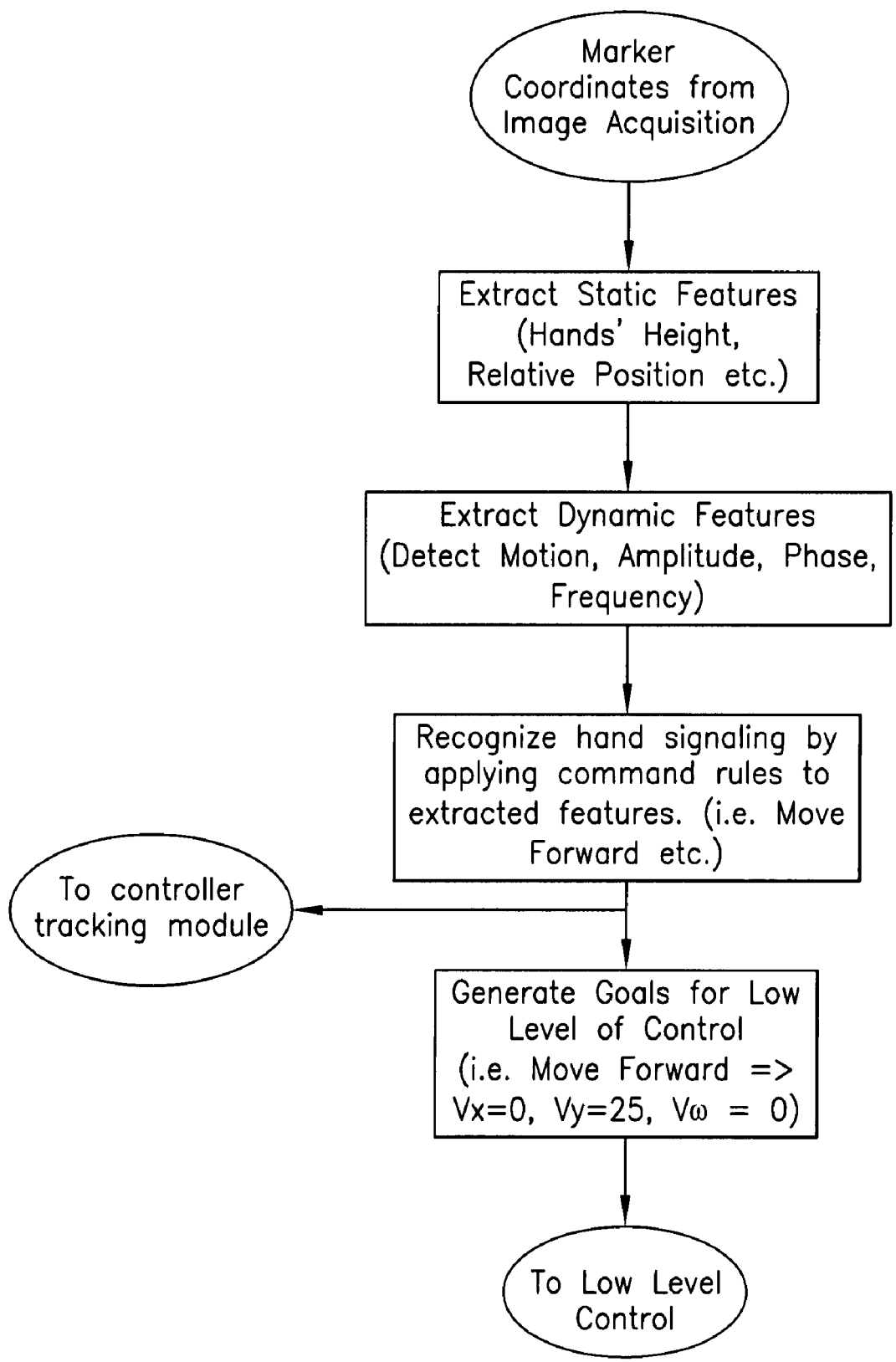
FIG. 16 is the system's gesture recognition software flow diagram illustrating the process of generation of motion decision from marker coordinates received from Video Data Acquisition.

FIG. 16 illustrates the software block flow diagram of the invention and includes the following functions:

Extract Features—receives Marker Coordinates from "Track Hands and Torso". It computes important relevant hand signal features. Combination of these features should uniquely describe any of the signals given to the robot. There are two types of features—Dynamic and Static. As these names imply they characterize position and motion of hand signaling.

Extract Dynamic Features—computes frequency, phase and amplitude of hand motion.

Extract Static Features—computes hands positions in space and position characterizations such as hands are extended.

Command Decision—receives current combination of the hand signaling motions from "Extract Features" Then these features are tested against a set of signal rules. Each rule has "antecedents" which are very specific combinations of features (i.e. hands are not moving and raised above the head) As soon as matching combination is encountered the rule is said to be "fired", leading to a production of motion decision. Since each "antecedent" is uniquely defined it is possible to avoid simultaneous firing of several rules. Two commands are fed-back to the Controller Tracking block. These commands are "Pass Control" (with direction characterization i.e. left or right) and "I have command" that indicates active controller. These commands are used to initiate and stop the search for the next active controller by the Controller Tracking portion of the Video Data Acquisition.

Generate Goals for Low Level of Control—receives command decision from Command Decision Block in the form of ASCII string (i.e. "Fast Forward" or "Move Left"). It assigns desired robot (UAV) velocities in Y, X axes and rotational Ω axis. Generating the Goals for Low Level of Control is the output from the High Level of Control.

Figure 17:
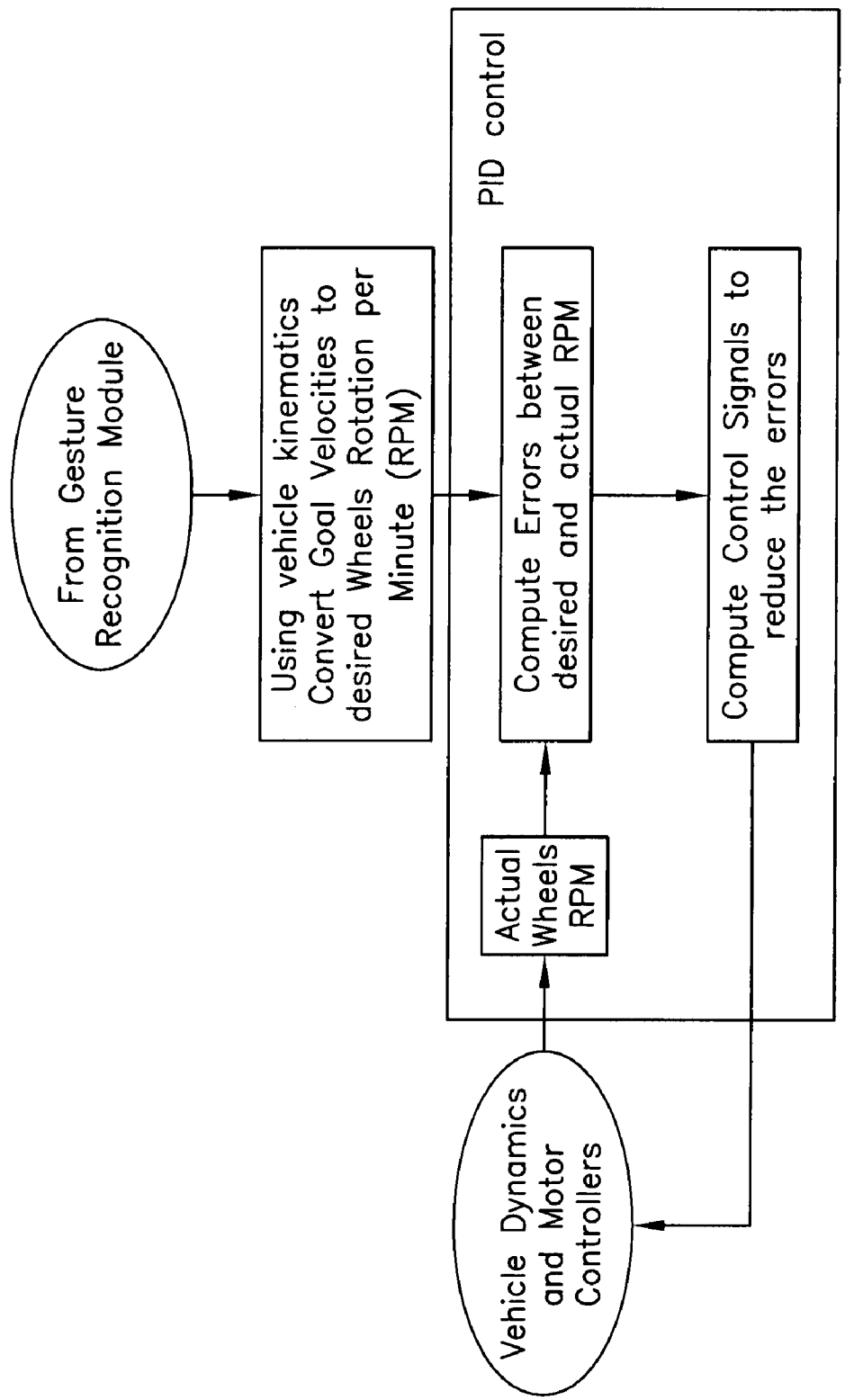
FIG. 17 is the system's low level of control flow diagram illustrating control of the robot after receiving High Level Control command of motion.

FIG. 17 illustrates the low level control process for the low level computer system of the invention including the following features:

Convert Desired Velocities to the desired wheels RPM—receives target velocities from Generate Goals for Low Level of Control block. This process has information about robot's kinematics, therefore it can compute required wheels RPM to meet the Velocity Goals that was posed by the High Level of Control.

Compute Errors between desired and actual wheels RPM—receives desired wheels RPM from the "Convert Desired Velocities" block and actual wheels RPM from robot's sensors. The difference between actual and desired RPM is the error that needs to be eliminated by the Proportional Integral Derivative (PID) controller.

Compute Control Signals—receives errors from "Compute Errors" block. The controller signal is computed using a combination of (a) product of some coefficient (proportional gain) and error, (b) product of integral of errors over some period of time and some coefficient (integral gain) and (c) product of derivative of error with respect to sampling interval and some coefficient (derivative gain). This control signal is directed to vehicle control amplifiers that power the robot's actuators or motors making the robot move to meet the desired goal of velocities that correspond to human signal commands.

Description of Source Code

The code for the Gesture Recognition System was written in the National Instruments Inc., object oriented graphical computer language named LabVIEW. The LabVIEW is a development environment geared towards control automation processes. The source code listing is presented in Appendix B.

Main function—"Combined HLC and LLC ver 5.vi" contains the main control loop. This loop runs three major sequences for the High Level Control. In addition to the High Level Control this main loop runs function called "LLC for PID with Dig Inhibit.vi". That function contains Low Level Control for the Gesture Recognition System.

First sequence contains Image Acquisition and Controller/Marker Tracking algorithms. This is done by the "track three points ver 4.vi" function. The second sequence contains feature extraction algorithms ran by function named "hand features.vi" The third sequence contains motion decision algorithm and the LLC goal generation algorithm. Motion decision is done by function called "command decoder.vi" and the goal generation is done by "convertCommand4LLC_from differencial ver 51.vi" function.

In addition to the above key function there are several utility functions—"Trigger command.vi". It checks if command has stabilized. If current command is the same as the previous commands in command buffer then trigger action. Normally it is sufficient to have 2 or 3 previous commands in the buffer. "Latch on enable.vi" function allows to enable the vehicle and retain this state of control until disable command is given. "Get Img Acq Params.vi" function demultiplexes a bundle of initialized image parameters. The group of functions located outside the control loop is initialization functions and closing functions necessary to graceful start up and shutdown of the system.

Conclusion

Although this invention has been described in relation to an exemplary embodiment thereof, it will be understood by those skilled in the art that still other variations and modifications can be affected in the preferred embodiment without detracting from the scope, and spirit of the invention as described in the claims.

What is claimed is:

1. A robotic gesture recognition system to enable control of robotic devices by a human user using gestures can be recognized by the system comprising:
 a robotic unit, with one or more electric motors or actuators,
 a video camera affixed to the robotic unit, said video camera of recording in pixel, format, panning, tilting and zooming;
 a high level control computer in communication with said video camera for enabling recognition of dynamic gestures and static poses of a user in pixel space via video imagery recorded by the video camera;
 said high level control computer operating to store and run a high level control gesture recognition application code to transform said dynamic gestures and static poses in pixel space to waveform data, and generating user commands therefrom, said high level control computer including decision-making rules implemented by comparison of said waveform data to a set of thresholds and forces one of the decision rules to be implemented;
 a low level control computer in communication with the high level control computer and the robotic unit, said low level control computer storing and running a low level of control gesture recognition application code to transform the user commands received from the high level control computer to control voltage commands;
 wherein said robotic unit receives and responds to the control voltage commands received m the low level control computer.

2. The robotic gesture recognition system of claim 1, wherein said robotic unit further comprises panic buttons for manually overriding the gesture recognition system.

3. The robotic gesture recognition system of claim 1, wherein said low level control computer runs computer code for monitoring states of switches on the panic buttons, and deactivating the gesture recognition system upon sensing activation of one or more of said switches.

4. The robotic gesture recognition system of claim 1, further comprising:
 a computer display means in communication with the high level control computer; and
 a user input means in communication with the high level control computer and the low level control computer.

5. The robotic gesture recognition system of claim 1, wherein said high level control computer enables recognition of dynamic gestures and static poses of a user in pixel space via video imagery recorded by said video camera by means for:
 receiving images from said video camera in pixel frames coded in HSL, RGB, or gray scale formats;
 locating points of left hand, right hand, upper torso and lower torso of the user in the video imagery, and registering these points in pixel frame coordinates recorded on video image frames;
 calculating a relative center point of a relative coordinate system, said relative center point being located at approximately the user's cranial region, based on the upper torso point and lower torso point in pixel frame coordinates;
 transforming the left hand point and the right hand point in pixel frame coordinates to a left hand point and right hand point in the relative coordinate system;
 extracting dynamic and static features of movement of the user from the waveform data for creating data sets for commands for said robotic device; and
 decoding dynamic and static features by correlating features to said decision-making rules and generating a user command.

6. The robotic gesture recognition system of claim 5, wherein said high level control computer includes means for:
 controlling zoom, pan and tilt camera states; and
 comparing the relative left hand point and relative right hand point of a previous video frame to the relative left hand point and relative right hand point of a current video frame, so as to transform the change on relative positions of the left hand points and right hand points to waveform data.

7. The robotic gesture recognition system of claim 1, wherein the low level control computer:

transforms values of motions goals from the high level control computer into desired robotic functions;

determines current states of the electric motors or actuators;

calculates desired states of the electric motors or actuators based on the desired robotic functions; and computes errors between the current states of the electric motors or actuators and the desired states of the electric motors or actuators; transforms said computed errors between the current states of the electric motors or actuator and the desired states of the electric motors or actuators into a control voltage command for production of electric current voltage to drive one or more of the electric motors or actuators.

8. The robotic gesture recognition system of claim 1, wherein the low level control computer generates feedback messages for display to the user, to inform the user of lack of or acquisition of control of the robotic device.

9. The robotic gesture recognition system of claim 1, wherein the low level control computer is operable to allow a user to override the gesture recognition application code by inputting direct user command data.

10. The robotic gesture recognition system of claim 1, wherein the video camera is capable of recording in the visible or infrared region.

11. A robotic gesture recognition system to enable control of robotic devices by a human user using gestures can be recognized by the system comprising:

a robotic unit, with one or more electric motors or actuators, a video camera affixed to the robotic unit, said video camera of recording in pixel, format, panning, tilting and zooming;

a computer including a high level control computer for implementing a high level of control and communicating with said video camera for enabling recognition of dynamic gestures and static poses of a user in pixel space via video imagery recorded by the video camera;

said high level control computer in communication with said video camera and operating to store and a high level of control gesture recognition application code to transform said dynamic gestures and static poses a-user's recognized gesture or movement in pixel space to waveform data, and generating user commands therefrom, said high level control computer including decision-making rules implemented by comparison of said waveform data to a set of thresholds and forces one of the decision rules to be implemented;

said computer also including a low level control computer implementing a low level of control and communicating with the robotic unit, said low level control computer storing and running a low level of control gesture recognition application code to transform the user commands received from the high level of control voltage commands;

wherein said robotic unit is in communication with the low level control computer, said robotic unit capable of receiving and responding to the control voltage commands received from e low level control computer.

* * * * *